US011935714B2

(12) United States Patent
Lenig et al.

(10) Patent No.: US 11,935,714 B2
(45) Date of Patent: Mar. 19, 2024

(54) CONTROLLING A CONTROLLABLY CONDUCTIVE DEVICE BASED ON ZERO-CROSSING DETECTION

(71) Applicant: Lutron Technology Company LLC, Coopersburg, PA (US)

(72) Inventors: Robert W. Lenig, Bethlehem, PA (US); Michael Sizemore, Center Valley, PA (US); Joshua W. Thaler, Philadelphia, PA (US); Russell L. MacAdam, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/149,113

(22) Filed: Jan. 1, 2023

(65) Prior Publication Data

US 2023/0141780 A1 May 11, 2023

Related U.S. Application Data

(63) Continuation of application No. 17/360,640, filed on Jun. 28, 2021, now Pat. No. 11,545,324, which is a
(Continued)

(51) Int. Cl.
*H01H 47/18* (2006.01)
*H01H 9/56* (2006.01)

(52) U.S. Cl.
CPC .............. *H01H 47/18* (2013.01); *H01H 9/56* (2013.01)

(58) Field of Classification Search
CPC ................................ H01H 47/18; H01H 9/56
See application file for complete search history.

(56) References Cited

U.S. PATENT DOCUMENTS 4,136,659 A 1/1979 Smith
4,704,652 A * 11/1987 Billings ................ H01H 9/542 361/13

(Continued)

OTHER PUBLICATIONS

"Lutron Soft Switch Technology." Lutron Electronics Co., Inc., Oct. 1998.

(Continued)

*Primary Examiner* — Jared Fureman
*Assistant Examiner* — Christopher J Clark
(74) *Attorney, Agent, or Firm* — Michael S. Czarnecki; Glen R. Farbanish; Philip N. Smith

(57) ABSTRACT

A load control device may control power delivered to an electrical load from an AC power source. The load control device may include a controllably conductive device adapted to be coupled in series electrical connection between the AC power source and the electrical load, a zero-cross detect circuit configured to generate a zero-cross signal representative of the zero-crossings of an AC voltage. The zero-cross signal may be characterized by pulses occurring in time with the zero-crossings of the AC voltage. The load control device may include a control circuit operatively coupled to the controllably conductive device and the zero cross detect circuit. The control circuit may be configured to identify a rising-edge time and a falling-edge time of one of the pulses of the zero-cross signal, and may control a conductive state of the controllably conductive device based on the rising-edge time and the falling-edge time of the pulse.

21 Claims, 20 Drawing Sheets

Related U.S. Application Data continuation of application No. 16/578,929, filed on Sep. 23, 2019, now Pat. No. 11,056,304, which is a continuation of application No. 15/997,328, filed on Jun. 4, 2018, now Pat. No. 10,424,451, which is a continuation of application No. 14/506,204, filed on Oct. 3, 2014, now Pat. No. 9,991,075.

(60) Provisional application No. 61/886,962, filed on Oct. 4, 2013, provisional application No. 61/887,006, filed on Oct. 4, 2013.

(56) References Cited

U.S. PATENT DOCUMENTS

| | | | | |
|---|---|---|---|---|
| 4,864,157 | A | 9/1989 | Dickey | |
| 5,530,615 | A * | 6/1996 | Miller | H01H 9/56 361/171 |
| 5,640,113 | A | 6/1997 | Hu | |
| 5,644,463 | A | 7/1997 | El-Sharkawi et al. | |
| 5,821,642 | A | 10/1998 | Nishhira et al. | |
| 5,838,077 | A | 11/1998 | Chelcun et al. | |
| 6,233,132 | B1 | 5/2001 | Jenski | |
| 6,768,615 | B2 | 7/2004 | Liu | |
| 7,522,400 | B2 | 4/2009 | Laurent et al. | |
| 8,154,841 | B2 | 4/2012 | Allen et al. | |
| 2006/0291119 | A1 | 12/2006 | Wang | |
| 2009/0027824 | A1 * | 1/2009 | Allen | H01H 9/56 361/170 |
| 2010/0244563 | A1 | 9/2010 | Fleck | |
| 2011/0184578 | A1 | 7/2011 | Elwell et al. | |
| 2012/0218792 | A1 | 8/2012 | Ziegler et al. | |
| 2014/0268474 | A1 | 9/2014 | Steiner et al. | |

OTHER PUBLICATIONS

Hannah, Randy, “Relay Technical Applications.” TE Connectivity Relay Products. Oct. 11, 2011.

“Contact Load/Life Performance Enhancement.” Application Note—Draft. Nov. 3, 2008.

* cited by examiner

CONTROLLING A CONTROLLABLY CONDUCTIVE DEVICE BASED ON ZERO-CROSSING DETECTION

CROSS REFERENCE TO RELATED APPLICATIONS

This application is a continuation of U.S. patent application Ser. No. 17/360,640 filed Jun. 28, 2021; which is a continuation of U.S. patent application Ser. No. 16/578,929 filed Sep. 23, 2019, now U.S. Pat. No. 11,056,304 issued Jul. 6, 2021; which is a continuation of U.S. patent application Ser. No. 15/997,328 filed Jun. 4, 2018, now U.S. Pat. No. 10,424,451 issued Sep. 24, 2019; which is a continuation of U.S. patent application Ser. No. 14/506,204 filed Oct. 3, 2014, now U.S. Pat. No. 9,991,075 issued Jun. 5, 2018; all of which claim the benefit of U.S. Provisional Patent Application No. 61/886,962 filed on Oct. 4, 2013 and U.S. Provisional Patent Application No. 61/887,006 filed on Oct. 4, 2013, each of which is incorporated herein by reference as if fully set forth.

BACKGROUND

Load control devices, such as switches, for example, use electrical relays to switch alternating currents being supplied to an electrical load. The life time of such electrical relays may be shortened by arcs or sparks caused at the instant when the relay closes. Some prior art systems seek to suppress arcs by controlling the relay actuation time such that the relay contact(s) close as nearly as possible to a zero cross of the alternating-current (AC) waveform.

FIG. 1 depicts an AC voltage waveform as controlled by an example prior art relay switch control circuit. Waveform 100 depicts the waveform of the AC power source, where the portion in dashed line may represent the voltage of the AC power source, and the portion in solid line may represent the voltage across an electrical load. As shown, the waveform 100 may cross through zero volts at voltage zero crossings such as the zero crossings 110A and 110B. The example prior art relay switch control circuit may include a voltage zero crossing detector for detecting the zero crossings such as the zero crossing 110A. The example prior art relay switch control circuit may store a relay-actuation delay 120, which corresponds to the time interval between the relay actuation time and the time when the relay contact(s) initially close in response to actuation. In operation, the relay switch control circuit may actuate the relay at relay actuation time 130A prior to the next zero crossing 110B. As shown, the relay actuation time 130A leads the next zero crossing 110B, or the target zero crossing for relay closure, by the relay-actuation delay 120 such that the relay contact (s) close at a time corresponding to the target zero crossing 110B.

In operation, the example prior art relay switch control circuit detects the zero crossing 110A, waits for a relay actuation adjustment 150A, and actuates the relay at time 130A. The relay actuation adjustment time period 150A corresponds to the difference between a full AC cycle and the relay-actuation delay time period 120. When the relay contact(s) are closed at the zero crossing 110B, substantially no current flows through the relay contact(s). The value of the relay-actuation delay time period 120 may be updated to account for any variation caused by temperature, and/or aging or deterioration over the life time of the relay.

When a relay closes, however, there is a settling time before the relay contact(s) come to rest in the closed state. For example, as shown in FIG. 1, the relay contact(s) may bounce one or more times for a time period 140 before becoming steadily closed. Bouncing results in wasted energy that may dissipate in the relay contact(s) as heat. This heat may cause the relay contact(s) to weld and become inoperative.

Some prior art systems seek to address this problem by offsetting the relay actuation time by one-half of the relay contact-bounce duration. FIG. 2 depicts an AC waveform as controlled by an example prior art relay switch control circuit with bounce compensation. Here, the relay actuation adjustment time period 150B corresponds to the difference between a full AC line cycle and the sum of relay-actuation delay time period 120 and one-half of the relay contact-bounce duration 140. In other words, the relay actuation adjustment time period 150B is less than the relay actuation adjustment time period 150A by one-half of the relay contact-bounce duration. A relay actuation time 130B leads the target zero crossing for relay closure by the relay-actuation delay time period 120 plus one-half of the relay contact-bounce duration 140. Consequently, as shown in FIG. 2, the relay contact(s) may continue bouncing for a period right after a zero cross possibly during high current conditions, thus suffering from similar behavior as shown in FIG. 1. Relay bouncing during this time period may cause the relay contact(s) to weld. Further, in operation, the duration of the relay bounce period may vary with each closure of the relay, thus the relay may actually become steadily closed at any time within the relay contact-bounce duration 140.

Some prior art systems also control the relay open actuation time such that the relay contact(s) open as nearly as possible to a zero crossing of the AC waveform. The relay actuation time is offset by an open time delay in a time-aligned manner relative to a zero-crossing. The hope is that the relay contact(s) will actually be opened when the power source current is substantially zero amps. Such prior art systems check whether the open time delay is outdated due to hardware aging, and replace the present value with a new value upon detecting that the open time delay is no longer correct. This type of reactive correction may still result in relays opening with a high voltage. Unfortunately, when a relay opens with a high voltage, undesirable arcing may occur and may persist through the next zero crossing. This may significantly shorten the operative life of the relay.

SUMMARY

A load control device may control power delivered to an electrical load from an AC power source. The load control device may include a controllably conductive device adapted to be coupled in series electrical connection between the AC power source and the electrical load, and a zero-cross detect circuit configured to generate a zero-cross signal representative of the zero-crossings of an AC voltage. The zero-cross signal may be characterized by pulses occurring in time with the zero-crossings of the AC voltage. The load control device may include a control circuit operatively coupled to the controllably conductive device and the zero cross detect circuit. The control circuit may be configured to identify a rising-edge time and a falling-edge time of a pulse of the zero-cross signal, and may control a conductive state of the controllably conductive device based on the rising-edge time and the falling-edge time of the pulse.

For example, the zero-cross detect circuit may generate a zero-cross signal representative of the zero-crossings of an AC voltage generated by the AC power source. In response to a turn-on or a turn-off command, the control circuit may determine a zero-cross time of a zero crossing of the AC voltage based on the rising-edge time and the falling-edge time of the respective pulse of the zero-cross signal, and may determine a time for changing the conductive state of the controllably conductive device based on the determined zero-cross time. For example, the zero-cross time may be determined by calculating the midpoint of the rise and falling-edge times of the respective pulse.

The control circuit may control the conductive state of the controllably conductive device by actuating the controllably conductive device. For example, the actuation of the controllably conductive device may be initiated at an actuation time, which may be determined based on a relay actuation adjustment associated with the controllably conductive device and a detected zero crossing. The relay actuation adjustment may be indicative of a time at which the relay drive voltage is adjusted relative to a subsequent zero-crossing for rendering the controllably conductive device conductive or non-conductive. The relay actuation adjustment may be indicative of a time at which the relay drive voltage is adjusted relative to a detected zero-crossing for rendering the controllably conductive device conductive or non-conductive. For example, the zero-cross detect circuit may generate a zero-cross signal representative of the zero-crossings of a switched-hot voltage generated by the controllably conductive device to be provided to the electrical load when the controllably conductive device is conductive. The control circuit may identify a rising-edge time and a falling-edge time of a pulse of the zero-cross signal. Based on the rising-edge time and the falling-edge time, the control circuit may determine whether an error in the conductive state change time has occurred. The control circuit may set an error window based on the rising-edge time and the falling-edge time of the pulse, and monitor conductive state of the controllably conductive device during the error window. Upon a determination that the conductive state changes within the error window, the control circuit may adjust the relay actuation adjustment associated with the controllably conductive device.

The error window may be dynamically set based on the rising-edge time and the falling-edge time of the pulse of the zero-cross signal. For example, the error window may be set as a period of time between the falling-edge time of a first subsequent pulse and the rising-edge time of a second consecutive subsequent pulse. A close error detection window may be set for relay close operations, for example, as a period of time after the falling-edge time of a subsequent pulse of the zero-cross signal. An open error detection window may be set for relay open operations, for example, as a period of time before the rising-edge time of a subsequent pulse of the zero-cross signal.

For example, the zero-cross detect circuit may generate a zero-cross signal representative of the zero-crossings of an AC voltage generated by the AC power source. The control circuit may determine zero-cross times of the AC voltage based on rising-edge times and falling-edge times of the pulses, and may vary conductive state change times of the controllably conductive device relative to their respective zero-cross times such as their respective target zero-cross times. The conductive state change times may be varied continuously within a time range prior to the target zero-cross times. The time range may be associated with a left barrier and a right barrier, where the left barrier may correspond to a predefined time prior to the target zero-cross time and the right barrier may correspond to the target zero-cross time. The conductive state change times may be varied such that the conductive state change times of the controllably conductive device may continuously move away from their respective target zero-cross times, e.g., in a given iteration. The conductive state change times associated with changing from a conductive state to a non-conductive state may be varied even when an error in the conductive state change time has not been detected.

As disclosed herein, the load control device for controlling an amount of power delivered to an electrical load from an AC power source may include a controllably conductive device adapted to be coupled in series electrical connection between the AC power source and the electrical load; a zero-cross detect circuit configured to generate a zero-cross signal representative of the zero-crossings of an AC main voltage of the AC power source, the zero-cross signal characterized by a plurality of pulses occurring in time with the zero-crossings of the AC voltage, and a control circuit operatively coupled to the controllably conductive device and the zero-cross detect circuit for rendering the controllably conductive device conductive and non-conductive in response to the zero-cross detect circuit to control the power delivered to the electrical load. The control circuit may be configured to store a rising-edge time and falling-edge time of one of the pulses of the zero-cross signal and to determine a zero-cross time of the respective zero-crossing of the AC voltage using both the rising-edge time and the falling-edge time of the respective pulse.

In addition, a method of determining a zero-crossing of an AC mains voltage generated by an AC power source is also disclosed herein. The method may include generating a zero-cross signal representative of the zero-crossings of the AC voltage, the zero-cross signal characterized by a plurality of pulses occurring in time with the zero-crossings of the AC voltage; storing a rising-edge time and a falling-edge time of one of the pulses of the zero-cross signal; and determining the zero-cross time of the respective zero-crossing of the AC voltage using both the rising-edge time and the falling-edge time of the respective pulse.

As disclosed herein, a load control device for controlling power delivered to an electrical load from an AC power source generating an AC voltage may include a controllably conductive device adapted to be coupled in series electrical connection between the AC power source and the electrical load; a zero-cross detect circuit configured to generate a zero-cross signal representative of the zero-crossings of the AC voltage, the zero-cross signal characterized by a plurality of pulses occurring in time with the zero-crossings of the AC voltage; and a control circuit operatively coupled to the controllably conductive device and the zero-cross detect circuit for rendering the controllably conductive device conductive and non-conductive in response to the zero-cross detect circuit to control the power delivered to the electrical load. The control circuit is configured to store a rising-edge time and a falling-edge time of one of the pulses of the zero-cross signal and to determine a zero-cross time of the respective zero crossing of the AC voltage using both the rising-edge time and the falling-edge time of the respective pulse.

In addition, a load control device for controlling power delivered to an electrical load from an AC power source generating an AC voltage, the load control device may include a relay adapted to be coupled in series electrical connection between the AC power source and the electrical load for generating a switched-hot voltage adapted to be provided to the electrical load, a control circuit configured to generate a drive voltage that is operatively coupled to the relay for rendering the relay conductive and non-conductive, the relay rendered conductive a first period of time after the drive voltage is adjusted and rendered non-conductive a second period of time after the drive voltage is adjusted, a hot zero-cross detect circuit configured to generate a hot zero-cross signal representative of the zero-crossings of the AC voltage, the hot zero-cross signal characterized by a plurality of pulses occurring in time with the zero-crossings of the AC voltage, a switched-hot zero-cross detect circuit configured to generate a switched-hot zero-cross signal representative of the zero-crossings of the switched-hot voltage, the switched-hot zero-cross signal characterized by a plurality of pulses occurring in time with the zero-crossings of the switched-hot voltage when the relay is conductive. The control circuit may be configured to receive the hot zero-cross signal and the switched-hot zero-cross signal, and to determine a zero-cross time of a pulse of the hot zero-cross signal. The control circuit is configured to store a rising-edge time and a falling-edge time of a pulse of the switched-hot zero-cross signal when the relay is conductive, and to set start and end times of an error detection window as a function of the zero-cross time of the hot zero-cross signal and the rising-edge time and falling-edge time of the switched-hot zero-cross signal.

DETAILED DESCRIPTION

Figure 1:
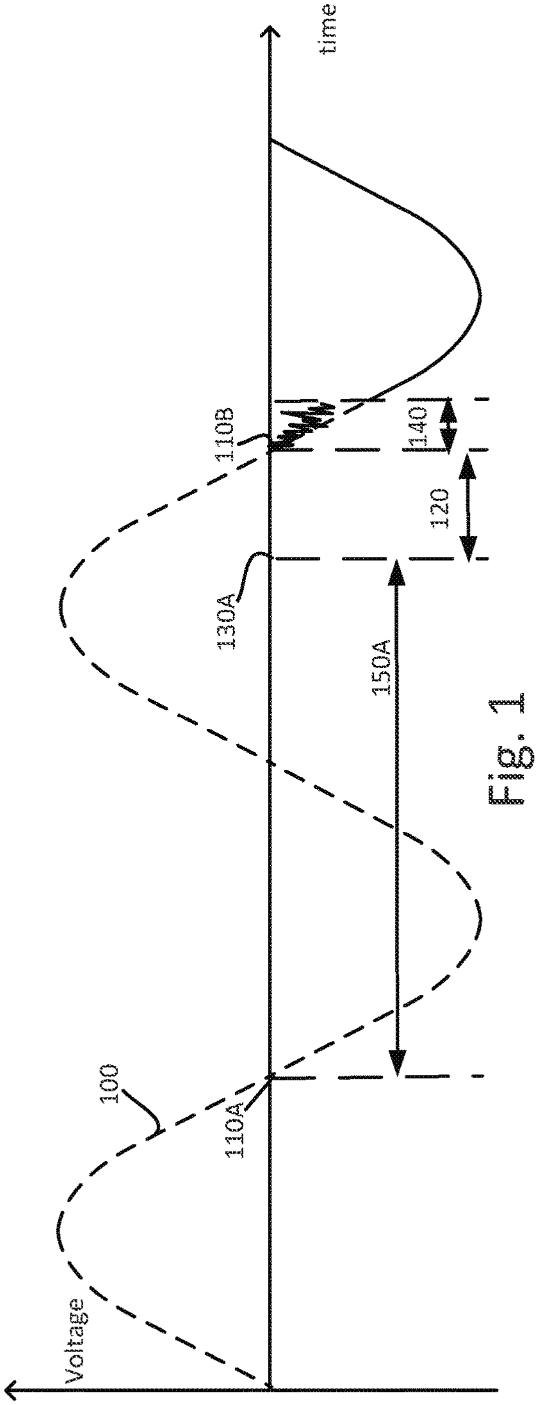
Fig. 1 Prior Art
FIG. 1 depicts an AC voltage waveform as controlled by an example prior art relay switch control circuit.
Figure 2:
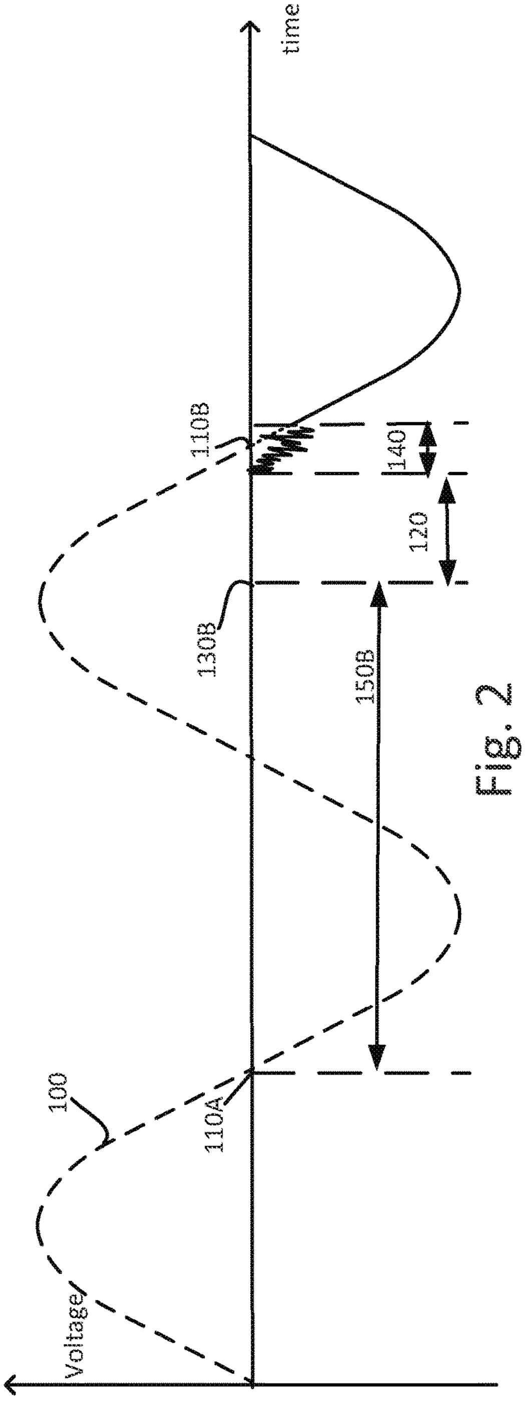
Fig. 2 Prior Art
FIG. 2 depicts an AC voltage waveform as controlled by an example prior art relay switch control circuit with bounce compensation.
Figure 3:
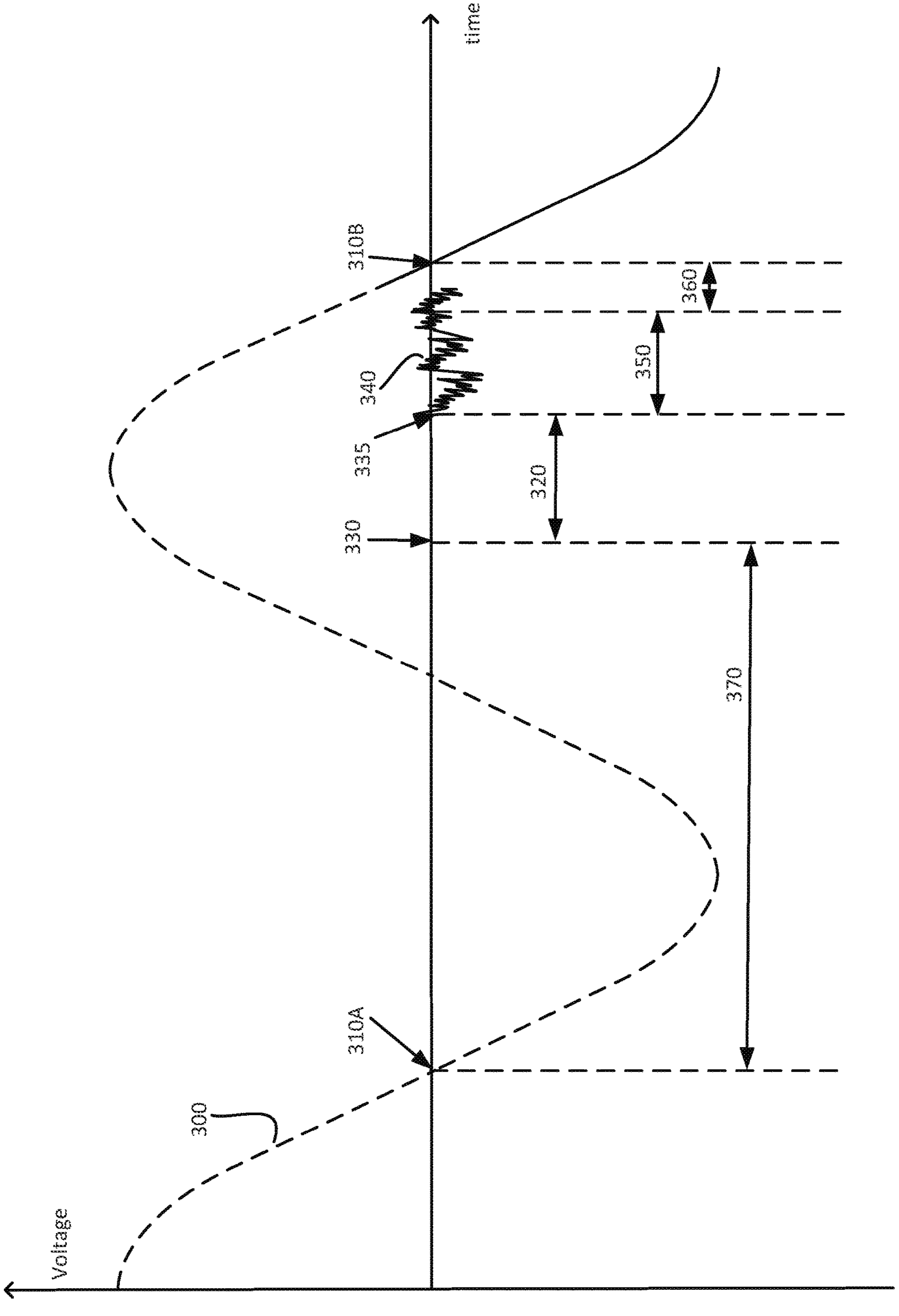
FIG. 3 depicts an AC waveform as controlled by an example load control device having adaptive zero cross relay switching with improved bounce compensation.

FIG. 3 depicts an AC waveform in an example load control device having adaptive zero cross relay switching with improved bounce compensation. Contact bouncing during high current conditions may shorten the operative life of a load control device. The load control device may control the relay actuation such that the relay contact(s) may reliably complete bouncing just prior to a zero crossing. For example, the relay actuation time may be adjusted such that the relay contact(s) may complete or substantially complete bouncing close to but prior to a target zero crossing. The load control device may use the average relay contact-bounce duration for determining the desirable relay contact actuation time. For example, in addition to relay actuation delay, the relay actuation time may be adjusted by one and one-half of the average relay contact-bounce duration.

As shown in FIG. 3, the load control device may actuate the relay at relay actuation time 330 such that relay contact bounce 340 may be completed prior to a target zero crossing 310B. In FIG. 3, waveform 300 depicts the waveform of the AC power source, where the portion in dashed line may represent the voltage of the AC power source, and the portion in solid line may represent the voltage across an electrical load. As shown, the AC waveform 300 may cross the neutral or zero line at voltage zero crossings such as the zero crossings 310A and 310B. The load control device may detect the zero crossings such as a zero crossing 310A and may target the relay contact(s) to close prior to a subsequent zero crossing such as the target zero crossing 310B.

The load control device may actuate the relay at the relay actuation time 330 prior to the target zero crossing 310B for the relay closure. As shown, the relay actuation time 330 may lead the target zero crossing 310B by a relay-actuation delay time period 320, the average relay contact-bounce duration 350 and one-half of the average relay contact-bounce duration 360. The relay-actuation delay time period 320 may correspond to the time interval between relay actuation time and when the relay contact(s) initially close in response to actuation.

In operation, the load control device may detect the zero crossing 310A, determine and wait for a relay actuation adjustment time period 370, and actuate the relay at the relay actuation time 330. The relay actuation adjustment time period 370 may correspond to the difference between a full AC line cycle and the sum of the relay-actuation delay time period 320, the average relay contact-bounce duration 350 and one-half of the average relay contact-bounce duration 360. As a result, after the relay is actuated at the relay actuation time 330, the contacts of the relay may initially close at relay initial closure time 335. The relay contact(s) may bounce for a relay contact-bounce duration. Although the relay contact-bounce duration of a relay may vary with each relay closure, because the load control device adjusts the relay actuation time by one and one-half of the relay contact-bounce duration, the contacts may reliably complete bouncing prior to but close to a target zero crossing. For example, the relay actuation adjustment time period 370 may be determined such that the relay contact completes bouncing just prior to a target zero crossing with 95% confidence interval when initiating the actuation based on the relay actuation adjustment.

Figure 4:
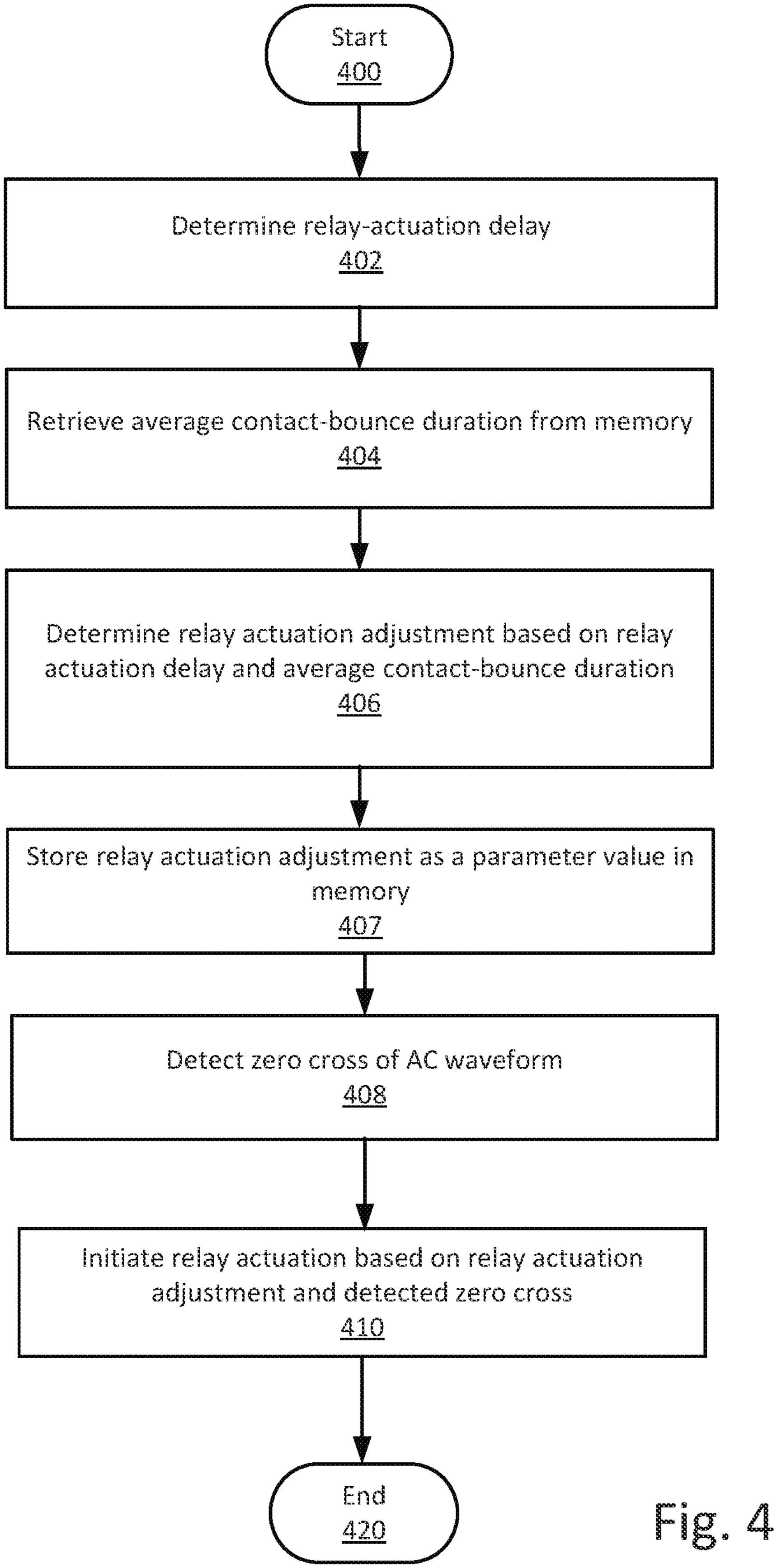
FIG. 4 is a flow diagram illustrating an example method as disclosed herein for adaptively controlling a closure of a relay switch such that the relay contact(s) reliably complete bouncing just prior to a zero cross.

FIG. 4 is a flow diagram illustrating an example method as disclosed herein for adaptively controlling a closure of a relay switch such that the relay contact(s) reliably complete bouncing just prior to a zero crossing. As shown, at 400, the method for adaptively controlling a relay switch may start. At 402, a relay-actuation delay time period may be determined. The relay actuation delay time period may correspond to the time difference between when the relay actuation starts and when the relay contact(s) are initially closed in response to the actuation. The determination is described herein, at least in relation to FIG. 7. The relay-actuation delay time period may be stored as a parameter value in memory. In operation, the relay-actuation delay time period may be retrieved from memory.

At 404, an average relay contact-bounce duration may be retrieved from memory. The average relay contact-bounce duration may correspond to the average amount of time the relay contact(s) may bounce during relay closure. For example, for certain relays, the average relay contact-bounce duration has been determined to be about 200 μs more or less. The average relay contact-bounce duration may be calculated based on the maximum relay contact-bounce duration observed through experimentation. For example, the average relay contact-bounce duration may be one half of the maximum relay contact-bounce duration. The average relay contact-bounce duration may be stored as a parameter value in memory. In operation, the average relay contact-bounce duration may be retrieved from memory. The average relay contact-bounce may be determined by the load control device during operation.

At 406, a relay actuation adjustment time period may be determined. The relay actuation adjustment time period may be indicative of the time interval between a detected zero crossing and when the relay closure is initiated. The relay actuation adjustment time period may be determined based on the relay-actuation delay time period and the average relay contact-bounce duration. For example, the relay actuation adjustment time period may be equal to a full AC line cycle minus the sum of the relay-actuation delay time period and one and one-half of the average relay contact-bounce duration (e.g., 300 μs). For example, the relay actuation adjustment time period may be equal to a full AC line cycle minus the sum of the relay-actuation delay time period and one and one-fourth of the average relay contact-bounce duration (e.g., 250 μs). For example, the relay actuation adjustment time period may be equal to a half AC line cycle minus the sum of the relay-actuation delay time period and one and one-half of the average relay contact-bounce duration, or a half AC cycle minus the sum of the relay-actuation delay time period and one and one-fourth of the average relay contact-bounce duration. At 407, the relay actuation adjustment time period may be stored as a parameter value in memory.

At 408, a zero crossing may be detected. For example, a voltage zero crossing of the AC waveform may be detected using a voltage zero crossing detector. For example, a current zero crossing of the AC waveform may be detected using a current zero crossing detector.

At 410, the relay actuation may be initiated based on the relay actuation adjustment time period and the detected zero crossing. For example, upon detecting the zero crossing, the relay actuation time may be determined based on the relay actuation adjustment time period value stored in memory and the time of the detected zero crossing. The relay actuation time may correspond to the time following a detected zero crossing by the relay actuation adjustment time period. In other words, the load control device may determine and wait for the relay actuation adjustment time period before actuating the relay at the relay actuation time. At 420, the method may end.

Figure 5:
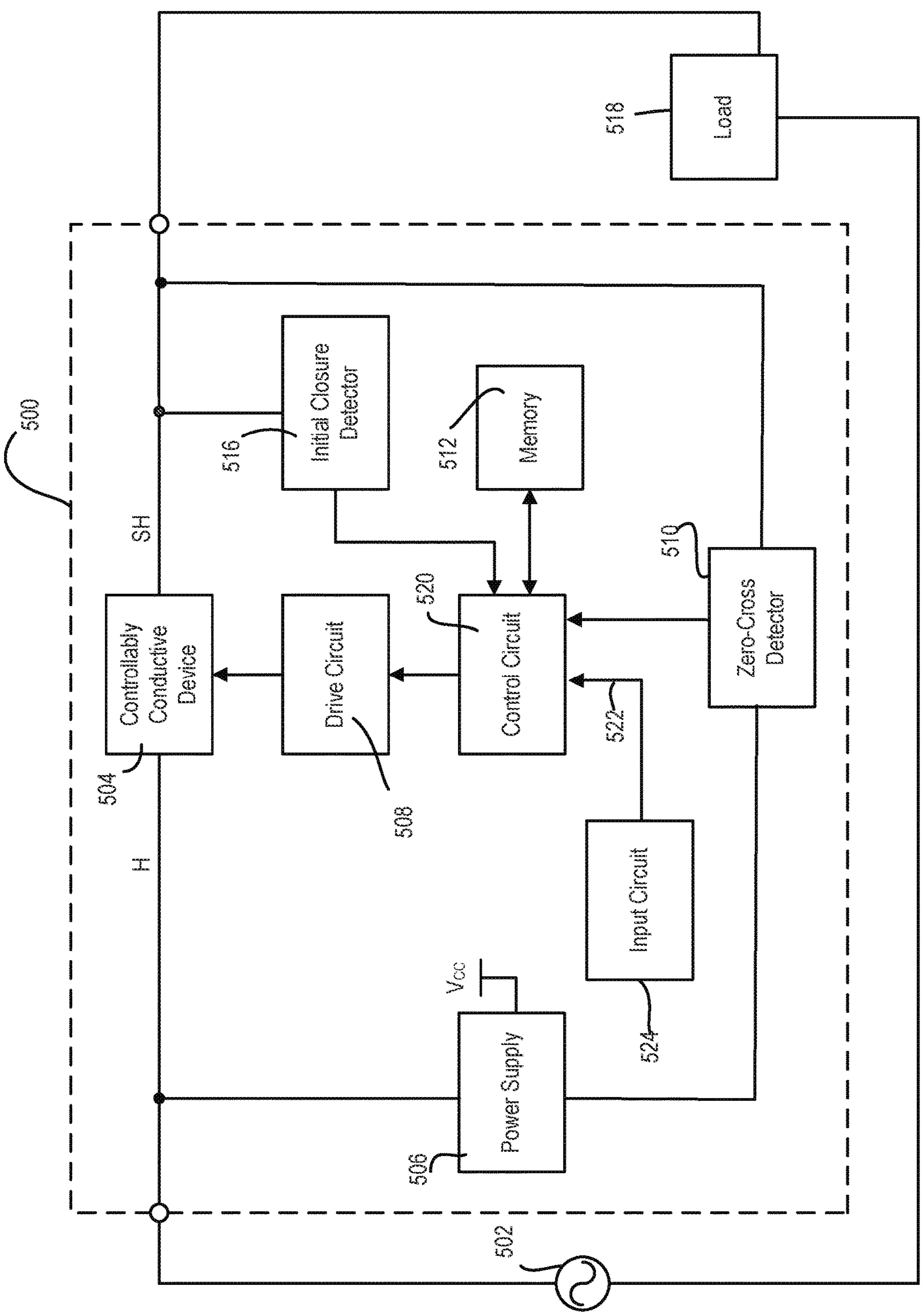
FIG. 5 is a simplified block diagram illustrating an example load control device as disclosed herein.

FIG. 5 is a schematic diagram illustrating an example load control device as disclosed herein. The method described in FIG. 4 may be performed by one or more components illustrated in FIG. 5. The load control device 500 may include a controllably conductive device 504 coupled in series electrical connection between an AC power source 502 via a hot terminal H and an electrical load 518 via a switched hot terminal SH for control of the power delivered to the electrical load 518. The controllably conductive device 504 may include a relay or other switching device, or any suitable type of bidirectional semiconductor switch, such as, for example, a triac, a field-effect transistor (FET) in a rectifier bridge, or two FETs in anti-series connection. The controllably conductive device 504 may include contacts that may bounce upon closure. The controllably conductive device 504 may include a control input coupled to a drive circuit 508.

The load control device 500 may include a control circuit 520 for controlling the operation of the load control device 500. The control circuit 520 may include a microcontroller, a programmable logic device (PLD), a microprocessor, an application specific integrated circuit (ASIC), a field-programmable gate array (FPGA), or any suitable processing device or control circuit. The load control device 500 may include a zero-cross detector 510 for detecting the zero crossings of the input AC waveform from the AC power source 502. A zero crossing may be the time at which the AC supply voltage transitions from positive to negative polarity, or from negative to positive polarity, at the beginning of each half-cycle. A zero crossing may be the time at which the AC supply current transitions from positive to negative polarity, or from negative to positive polarity, at the beginning of each half-cycle. The control circuit 520 may receive the zero cross information from the zero-cross detector 510 and may provide the control inputs to the drive circuit 508 to render the controllably conductive device 504 conductive and non-conductive at predetermined times relative to the zero crossings of the AC waveform. For example, the zero-cross detector 510 may generate a zero cross signal to the control circuit 520 upon detecting a voltage zero crossing. The zero-cross detector 510 may generate a zero cross signal to the control circuit 520 upon detecting a voltage zero crossing when the AC power source 502 enters a negative half cycle and when the AC power source 502 enters a positive half cycle. The zero-cross detector 510 may generate a zero cross signal to the control circuit 520 upon detecting a voltage zero crossing only when the AC power source 502 enters a negative half cycle. The zero-cross detector 510 may generate a zero cross signal to the control circuit 520 upon detecting a voltage zero crossing only when the AC power source 502 enters a positive half cycle. The zero-cross detector 510 may generate a zero cross edge interrupt upon detecting the zero crossing.

The control circuit 520 may also be coupled to a memory 512 for storage and/or retrieval of the average relay-bounce duration, the relay actuation adjustment time period, the duration of a half cycle, the duration of a full cycle, the relay-actuation delay time period, instructions/settings for controlling the electrical load 518, and/or the like. The memory 512 may be implemented as an external integrated circuit (IC) or as an internal circuit of the control circuit 520. A power supply 506 may generate a direct-current (DC) voltage $V_{CC}$ for powering the control circuit 520, the memory 512, and other low voltage circuitry of the load control device 500.

The load control device 500 may include an initial closure detector 516 for detecting an initial closure of the controllably conductive device 504. Upon detecting the initial closure of the controllably conductive device 504, the initial closure detector 516 may generate an initial closure signal to the control circuit 520. The initial closure detector 516 may generate an initial closure signal to the control circuit 520 when the relay is closed in a negative half cycle and when the relay is closed in a positive half cycle. The initial closure detector 516 may generate an initial closure signal to the control circuit 520 only when the relay is closed in a negative half cycle. The initial closure detector 516 may generate an initial closure signal to the control circuit 520 only when the relay is closed in a positive half cycle. The initial closure detector 516 may generate an initial closure edge interrupt on the initial closure signal upon detecting the initial closure of the controllably conductive device 504. The initial closure detector 516 may comprise similar circuitry as the zero-cross detector 510.

The control circuit 520 may receive an input signal 522 from an input circuit 524 (e.g., such as a user interface). Upon receiving an input signal 522 indicating the controllably conductive device is to be conductive, the control circuit 520 may initiate relay actuation such that the relay contact(s) complete or substantially complete bouncing just prior to a subsequent zero crossing. For example, upon receiving the input signal 522, the control circuit 520 may wait for a signal from the zero-cross detector indicating a voltage zero cross has occurred. The control circuit 520 may determine a time, based on the timing of the zero crossing, for providing a drive signal to the drive circuit 508 to actuate the controllably conductive device 504. The time for providing a drive signal to the drive circuit 508 may correspond to the relay actuation time 330 described herein with respect to FIG. 3, the relay actuation time 2030 described herein with respect to FIG. 20 and/or the relay actuation time 2130 described herein with respect to FIG. 21.

Figure 6:
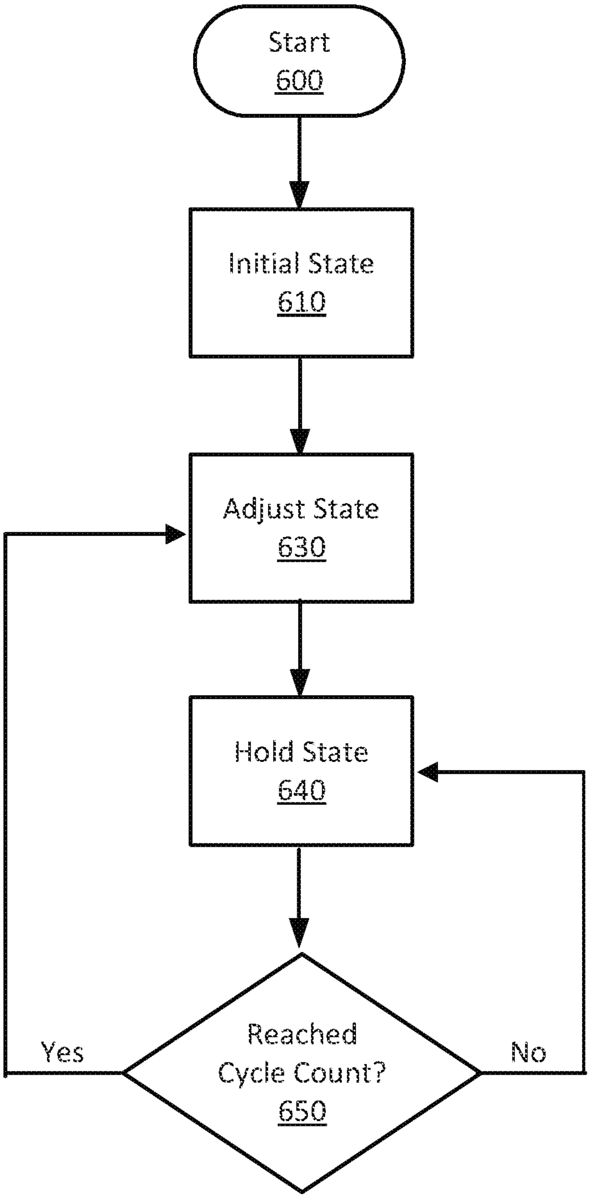
FIG. 6 is a state diagram illustrating an example implementation of adaptively controlling a relay such that the relay contact(s) reliably complete bouncing just prior to a zero cross.

FIG. 6 is a state diagram illustrating an example implementation of adaptively controlling a relay such that the relay contact(s) reliably complete bouncing just prior to a zero crossing. At 600, the adaptive controlling of the relay may start. At 610, the load control device 500 may operate in an initial state. In the initial state, the controller 520 may identify a wiring configuration based on the zero cross signal and the initial closure signal. The controller 520 may determine that the wiring configuration is standard wiring based on a determination that the zero cross signal generates interrupts when the relay is open. For example, the wiring configuration of the load control device 500 may be considered the standard wiring configuration when the hot terminal H is coupled to the AC power source 502 and the switched hot terminal SH is coupled to the electrical load 518. The wiring configuration of the load control device 500 may be the reverse wiring configuration when the switched hot terminal SH is coupled to the AC power source 502 and the hot terminal H is coupled to the electrical load 518. The control circuit 520 may determine that the wiring configuration may be a reverse wiring based on a determination that the initial closure signal generates interrupts when the relay is open. When reverse wiring is identified, the control circuit 520 may use the zero cross signal as the initial closure signal and use the initial closure signal as the zero cross signal. In addition, during the initial state 610, the load control device 500 may initially use a baseline relay actuation adjustment time period which may be a predetermined value. The baseline relay actuation adjustment time period may be used for adjusting the actuation adjustment time period in an adjust state described herein.

At 630, the load control device 500 may operate in the adjust state. In the adjust state, the control circuit 520 may be operable to determine the relay actuation adjustment time period 370 by adjusting from the baseline relay actuation adjustment time period. The relay actuation adjustment time period 370 may be determined such that the relay contact may complete or substantially complete bouncing close to but prior to a target zero crossing. The control circuit 520 may determine the relay actuation delay time period associated with the relay based on the time difference between the zero cross signal and the initial closure signal.

Figure 7:
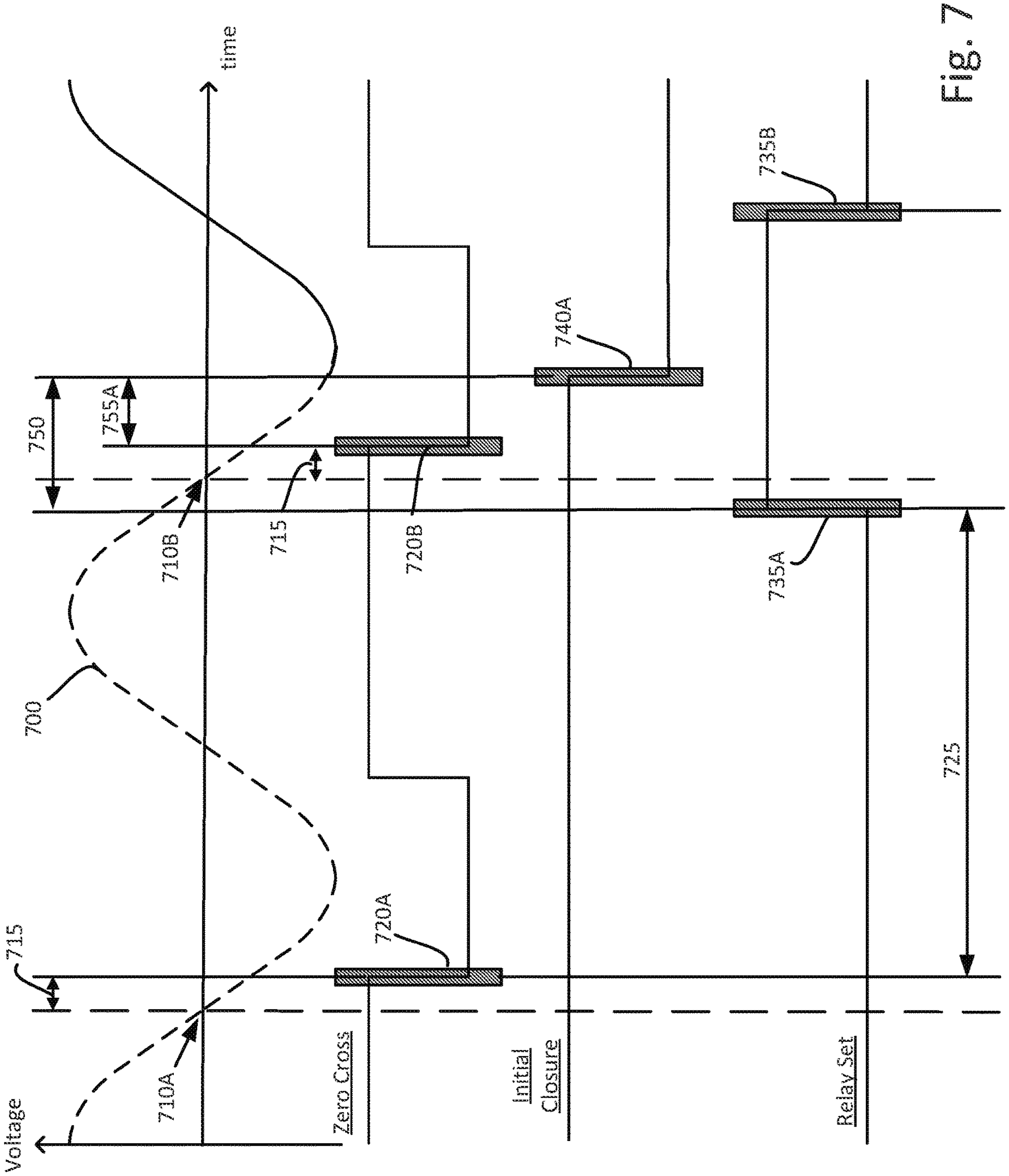
FIGS. 7 and 8 depict waveforms in an example load control device having adaptive zero cross relay switching with improved bounce compensation.
Figure 8:
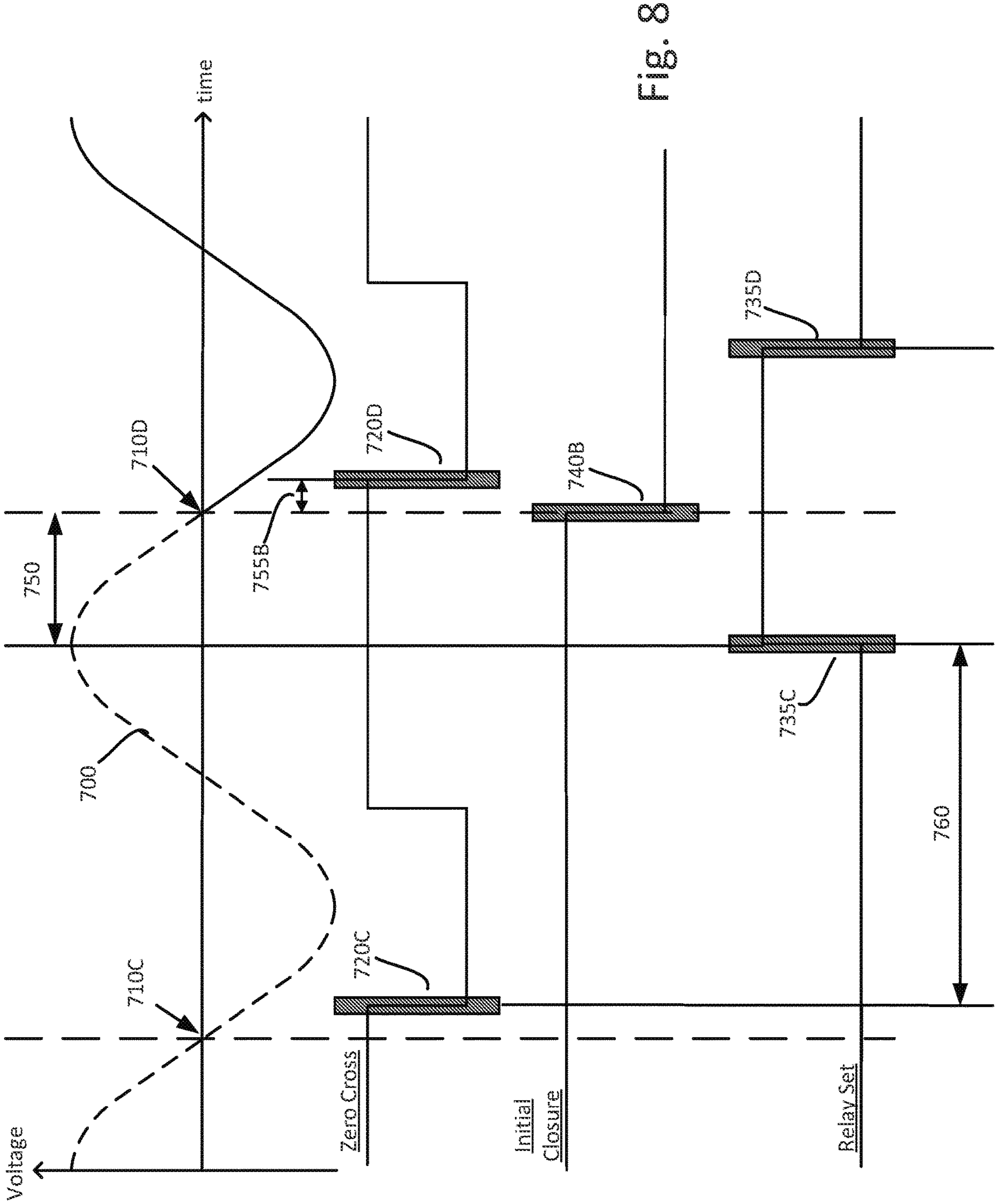

FIGS. 7 and 8 are waveform diagrams showing an example of adjusting the relay actuation time, for example, in the adjust state. In FIG. 7, waveform 700 depicts the waveform of the AC power source, where the portion in dashed line may represent the voltage of the AC power source, and the portion in solid line may represent the voltage across an electrical load. As shown, the AC waveform 700 may cross through zero volts at voltage zero crossings such as the zero crossings 710A and 710B.

The control circuit 520 may initiate a turn on sequence and wait for a first zero cross edge interrupt 720A. The zero-cross detector 510 may detect zero crossing 710A, and may generate first zero cross edge interrupt 720A. The first zero cross edge interrupt 720A may be received briefly after the actual zero crossing 710A, for example, after a hardware delay 715.

Upon receiving the zero cross edge interrupt 720A, the control circuit 520 may determine a relay actuation time 735A. The relay actuation time 735A may correspond to a time point following the zero cross edge interrupt 720A by the baseline relay actuation adjustment time period 725. For example, the control circuit 520 may start a timer that may stop or expire after running for the baseline relay actuation adjustment time period 725 to trigger the relay actuation at the relay actuation time 735A. When the timer expires, the control circuit 520 may generate a relay set signal to the drive circuit 508. The relay set signal may remain active for a relay actuation duration. For example, if the relay is a latching relay, the relay actuation duration may be the time between the relay actuation time 735C and a relay release time 735B. The relay set signal may remain active for the entire time that the relay is to be closed.

The control circuit 520 may receive a second zero cross edge interrupt 720B. The second zero cross edge interrupt 720B may be received briefly after the zero-cross detector 510 detects the actual zero crossing 710B, for example, after the hardware delay 715. Upon actuation of the relay at the relay actuation time 735A, the relay contact may initially close after the relay actuation delay or the relay close delay 750. The initial closure detector 516 may detect an initial closure of the relay contact(s) and may generate an initial closure edge interrupt 740A on the initial closure signal. The control circuit 520 may receive an initial closure edge interrupt 740A on the initial closure signal when the relay contact(s) initially close (e.g., prior to any potential relay bounce not shown in FIG. 7.) The relay-actuation delay associated with the controllably conductive device 504, which may correspond to the time difference between when the relay actuation starts and when the relay contact(s) are initially closed in response to the actuation, may be determined based on the time difference between the relay actuation time 735A and the initial closure edge interrupt 740A. The control circuit 520 may calculate a switching differential period 755A that may correspond to the time difference between the initial closure edge interrupt 740A and the zero cross edge interrupt 720B.

The control circuit 520 may adjust the baseline relay actuation adjustment based on the switching differential 755A and the hardware delay 715. For example, the adjusted relay actuation adjustment time period may be equal to the baseline relay actuation adjustment time period modified by the difference between the switching differential period 755A and the hardware delay period 715 (e.g., adjusted relay actuation adjustment time period=baseline relay actuation adjustment time period−(switching differential period−hardware delay period)).

FIG. 8 illustrates how the relay closes at the zero crossing when the adjusted relay actuation adjustment time period is used. As shown, the AC waveform 700 may cross through zero volts at voltage zero crossings such as the zero crossings 710C and 710D.

The control circuit 520 may initiate a turn on sequence and wait for a first zero cross edge interrupt 720C. The zero-cross detector 510 may detect a zero crossing 710C, and may generate first zero cross edge interrupt 720C. The first zero cross edge interrupt 720C may be received briefly after the actual zero crossing 710C. Upon receiving the zero cross edge interrupt 720C, the control circuit 520 may determine an adjusted relay actuation time 735C. The adjusted relay actuation time 735C may correspond to the adjusted relay actuation adjustment time period 760 after the zero cross edge interrupt 720C. The adjusted relay actuation adjustment time period 760 may be determined based on the previous switching differential period (e.g., the switching differential period 755A shown in FIG. 7) and the hardware delay period 715. The adjusted relay actuation adjustment time period 760 may be determined by altering the baseline relay actuation adjustment time period or the previous relay actuation adjustment time period by a predetermined amount or as a factor the switching differential period (e.g., one-half of the switching differential period). The adjusted relay actuation adjustment time period 760 may be determined by incrementing or decrementing the baseline relay actuation adjustment time period or the previous relay actuation adjustment time period by a predetermined amount.

The control circuit 520 may start a timer that may stop or expire after running for the adjusted relay actuation adjustment time period 760 to trigger relay actuation at an adjusted relay actuation time 735C. When the timer expires, the control circuit 520 may generate a relay set signal to the drive circuit 508. The relay set signal may continue to be active from the relay actuation time until the relay release time 735D. The control circuit 520 may receive a second zero cross edge interrupt 720D. The second zero cross edge interrupt 720D may be received briefly after the zero-cross detector 510 detecting the actual zero crossing 710D. Upon actuation of the relay at the adjusted relay actuation time 735C, the relay contact may initially close after relay actuation delay time period or the relay close delay time period 750. The initial closure detector 516 may detect an initial closure of the relay contact(s) and may generate an initial closure edge interrupt 740B on the initial closure signal. The control circuit 520 may receive an initial closure edge interrupt 740B on the initial closure signal when the relay contact initially closes. The control circuit 520 may calculate a new switching differential period 755B that may correspond to the time difference between the initial closure edge interrupt 740B and the zero cross edge interrupt 720D. The new switching differential period 755B may be indicative of the time difference between the initial closure of the relay contact and the target zero crossing.

The control circuit 520 may compare the new switching differential period 755B to the hardware delay period 715 to determine whether to further adjust the relay actuation adjustment time period. The control circuit 520 may determine to further adjust the relay actuation adjustment time period when the new switching differential period 755B is not equal to or is outside of a predetermined range of the hardware delay period 715. This may indicate that when the relay is actuated based on the adjusted relay actuation time, the relay does not initially close at, or close to, the target zero crossing such as zero crossing 710D. The control circuit 520 may determine to adopt a given value of the relay actuation adjustment time period when the resulting switching differential period 755B is equal to or within a predetermined range of the hardware delay period 715. This may indicate that when the relay is actuated based on the adjusted relay actuation time, the relay is initially closed at, or sufficiently close to, the target zero crossing such as zero crossing 710D.

Upon determining a relay actuation adjustment time period that may allow the relay contact to initially close at a target zero crossing, the control circuit 520 may offset the relay actuation adjustment time period by one and one half of the average relay contact-bounce duration. The control circuit 520 may similarly determine a relay actuation adjustment time period for relay open operations.

The relay actuation delay time period or relay close delay time period 750 may change throughout the life of a relay due to aging or deterioration or due to different temperature or voltage conditions. The relay actuation adjustment time period may be updated using the process described herein with respect to FIGS. 7 and 8 to compensate for such changes. The adjustment may be performed, for example, periodically or upon detection of an error in closure time.

Turning back to FIG. 6, upon determining a relay actuation adjustment time period that may allow the relay contact to complete or substantially complete bouncing just prior to a zero crossing (e.g., at some point within the average relay contact-bounce duration 350 and the one-half of the average relay contact-bounce duration 360), the load control device 500 may operate in a hold state 640. In the hold state, the control circuit 520 may be operable to control the actuation of the controllably conductive device 504 based on the relay actuation adjustment time period and the zero cross signal generated by the zero-cross detector 510.

In the hold state 640, the control circuit 520 may not adjust the relay actuation adjustment time period 370 for a predetermined number of switching cycles. For example, the load control device may transition from the hold state to the adjust state every predetermined number of switching cycles such as a switching cycle hold count. At 650, the control circuit 520 may determine whether the switching cycle hold count has been reached. The switching cycle hold count may be 900, 1000, 700 or the like. Based on a determination that the switching cycle hold count has been reached, the load control device 500 may transition from the hold state to the adjust state. The relay set time may be adjusted by the switching differential prior to entering the adjust state. Based on a determination that the switching cycle hold count has not been reached, the load control device 500 may continue to operate in the hold state.

In the hold state 640, the control circuit 520 may monitor the time difference between the initial closure of the relay and the target zero crossing. The control circuit 520 may compare the time difference to a predetermined threshold and determine whether a readjustment of the value of the relay actuation adjustment time period may be needed. For example, if the time difference is below a predetermined threshold, the control circuit 520 may alter, such as increment, the switching cycle hold count by 1. Upon detecting the time difference exceeding the predetermined threshold, the control circuit 520 may alter the switching cycle hold count by a significantly larger number such as 100, 150, 200, or the like such that the control circuit may transition from the hold state 640 to the adjust state 630 before a predetermined number of switching cycles have actually occurred. Similarly, the control circuit 520 may monitor the time difference between the opening (e.g., initial opening) of the relay and the target zero crossing, and may alter the switching cycle hold count accordingly. There may be a switching cycle hold count associated with relay closing operations and a switching cycle hold count associated with relay opening operations.

In the hold state, the control circuit 520 may compare the time difference between the initial closure of the relay and the target zero crossing to a predetermined high error threshold. Upon detecting the time difference exceeding the high error threshold, the load control device 500 may immediately transition to the adjust state. The control circuit 520 may compare the time difference between the opening (e.g., initial opening) of the relay and the target zero crossing to a predetermined high error threshold. Upon detecting the time difference exceeding the high error threshold, the load control device 500 may immediately transition to the adjust state.

The load control device 500 may close the controllably conductive device 504 in alternating half cycles. Closing the controllably conductive device 504 in alternating half cycles may extend the operative life of the controllably conductive device. If the current flow always occurs in the same direction when closing a relay, material may transfer between the relay contact(s) over time. Alternating between switching when there is a positive and negative current flow may prevent or reduce such undesirable material transfer.

As described herein, the control circuit 520 may monitor the time difference between the initial closure of the relay contact and the target zero crossing. This time difference may be measured differently when closing the relay just prior to a positive half-cycle and when closing the relay just prior to a negative half-cycle. In an embodiment, the time difference can only be measured in the negative half-cycle.

Figure 9:
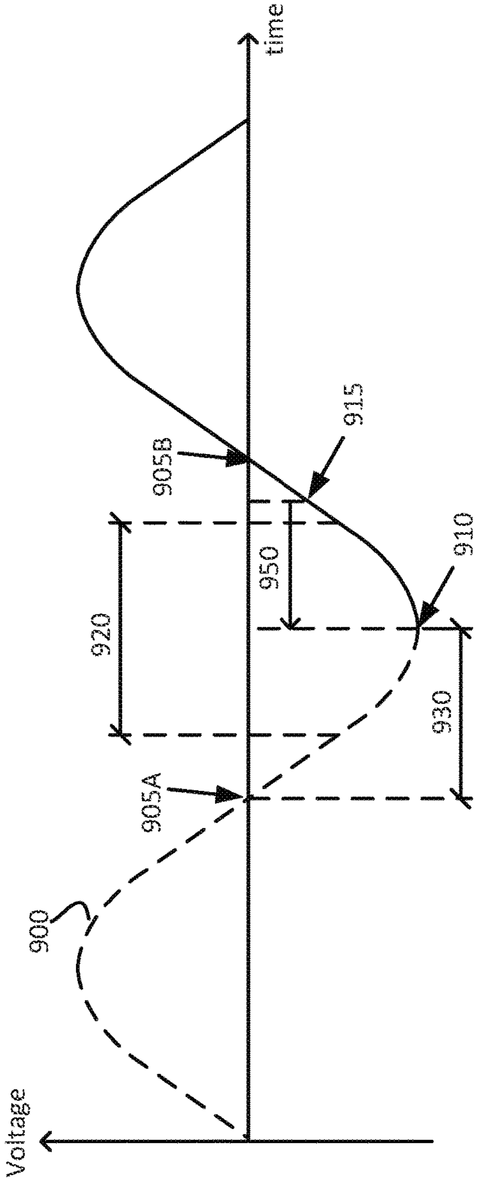
FIG. 9 depicts an AC waveform as controlled by an example load control device operable to detect potential errors when closing a relay prior to a positive half cycle.

FIG. 9 depicts an AC waveform as controlled by an example load control device (e.g., the load control device 500) operable to detect potential errors when closing a relay prior to a positive half cycle. In FIG. 9, waveform 900 depicts the waveform of the AC power source, where the portion in dashed line may represent the voltage of the AC power source, and the portion in solid line may represent the voltage across an electrical load. As shown in FIG. 9, the target closure time 915 may be just prior to a zero crossing 905B. The zero-cross detector 510 may generate a zero cross signal to the control circuit 520 upon detecting the zero crossing 905A. The initial closure detector 516 may detect that the relay contact initially closes at 910. The control circuit 520 may determine whether the detected initial closure 910 falls within an error window 920. The error window may include a preset window (e.g., 500 μs after the negative half-cycle zero crossing 905A and 1 ms prior to the positive half cycle zero crossing 905B). If the detected initial closure 910 falls within the error window 920, the switching cycle hold count may be altered such that the hold state may exit prior to the regular hold state period. The switching differential as described herein, for example, with respect to FIGS. 7 and 8, may be calculated based on the difference 930 between the detected zero crossing 905A and the detected initial closure 910.

The control circuit 520 may determine whether a detected opening falls within an error window. The error window may include a preset window (e.g., 500 μs after the negative half-cycle zero crossing 905A and 1 ms prior to the positive half cycle zero crossing 905B). The error window associated with relay opening operations may be the same or different than the error window associated with relay closing operations. If the detected opening falls within the error window 920, the switching cycle hold count may be altered such that the hold state may exit prior to the regular hold state period. The switching differential as described herein, for example, with respect to FIGS. 7 and 8, may be calculated based on the difference 930 between the detected zero crossing 905A and the detected opening.

Figure 10:
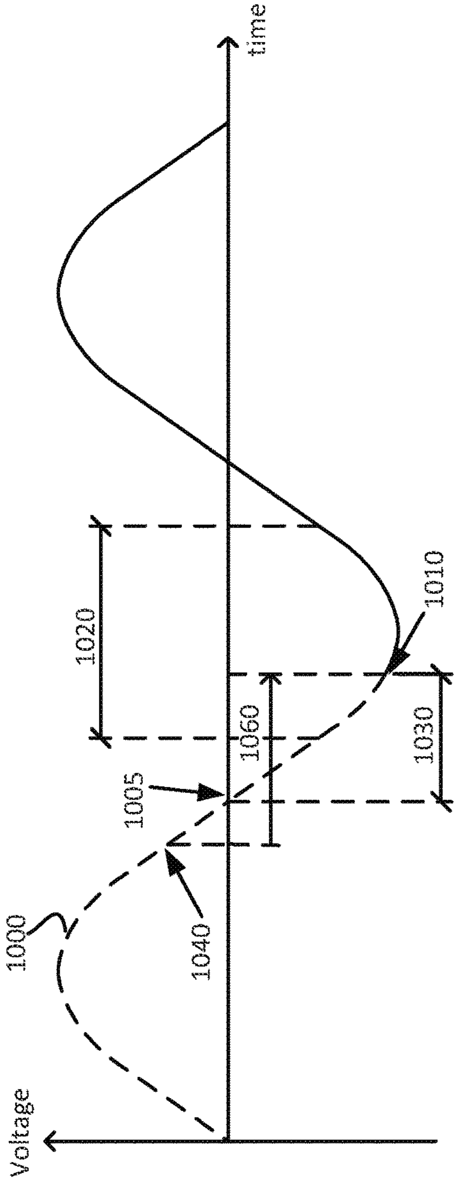
FIG. 10 depicts an AC waveform as controlled by an example load control device operable to detect potential errors when closing a relay prior to a negative half cycle.

FIG. 10 depicts an AC waveform as controlled by an example load control device (e.g., the load control device 500) operable to detect potential errors when closing a relay prior to a negative half cycle. In FIG. 10, waveform 1000 depicts the waveform of the AC power source, the portion in dashed line may represent the voltage of the AC power source, and the portion in solid line may represent the voltage across an electrical load. As shown in FIG. 10, the target closure time 1040 may be just prior to a zero crossing 1005. The zero-cross detector 510 may generate a zero cross signal to the control circuit 520 upon detecting the zero crossing 1005. The initial closure detector 516 may detect that the relay contact initially closes at 1010. The control circuit 520 may determine whether the detected initial closure 1010 falls within an error window 1020. The error window 1020 may include a preset window (e.g., 500 μs after the negative half-cycle zero crossing 1005 and 1 ms prior to the positive half cycle). If the detected initial closure 1010 falls within the error window 1020, the switching cycle hold count may be altered such that the hold state may exit prior to the regular hold state period. The switching differential as described herein, for example, with respect to FIGS. 7 and 8, may be calculated based on the difference 1030 between the detected zero crossing 1005 and the detected initial closure 1010.

If a relay closure is measured in an error window, the switching cycle hold count may be altered such that the hold state may exit prior to the regular hold state period. The switching cycle hold count may be altered by a different value based on whether the error in the closure is caused by an increase in the relay-actuation delay or by a decrease in the relay-actuation delay. For example, when the target closure is just before a positive half-cycle, a decrease in the relay-actuation delay time period can be measured. When the target closure is just before a negative half-cycle, an increase in relay-actuation delay time period can be measured. As a large decrease in the relay-actuation delay time period may signify an erroneous lock was achieved, for example, at a low relay voltage, the switching cycle hold count may be altered by a larger value if the error in closure time or relay actuation time is caused by a decrease in the relay-actuation delay time period than by an increase in the relay-actuation delay time period.

As shown in FIG. 9, the detected initial closure 910 falling within the error window 920 may be due to the relay-actuation delay time period being decreased by a delay decrease period 950. When a relay-actuation delay decrease period is detected, the control circuit 520 may alter the switching cycle hold count by a first predetermined value (e.g., 200). As shown in FIG. 10, the detected initial closure 1010 falling within the error window 1020 may be due to the relay-actuation delay time period being increased by an adjustment increase period 1060. When a relay-actuation delay increase period is detected, the control circuit 520 may alter the switching cycle hold count by a second predetermined value (e.g., 100). The relay set time may be adjusted by the error amount prior to entering the adjust state. The error amount may correspond to the difference 930 between the detected zero cross 905A and the detected initial closure 910, or the difference 1030 between the detected zero cross 1005 and the detected initial closure 1010.

Figure 11:
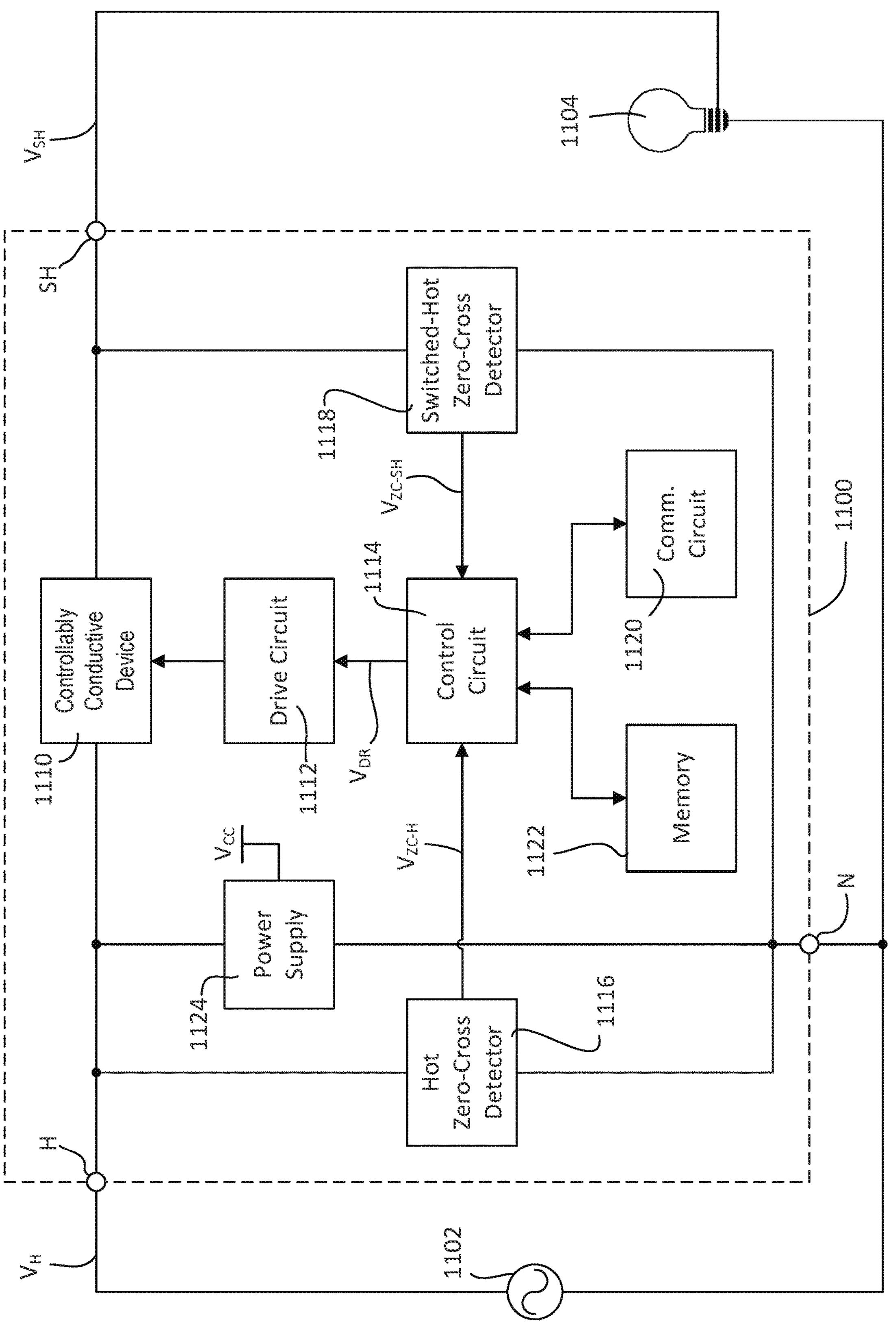
FIG. 11 is a simplified block diagram illustrating an example of a load control device.
Figure 12:
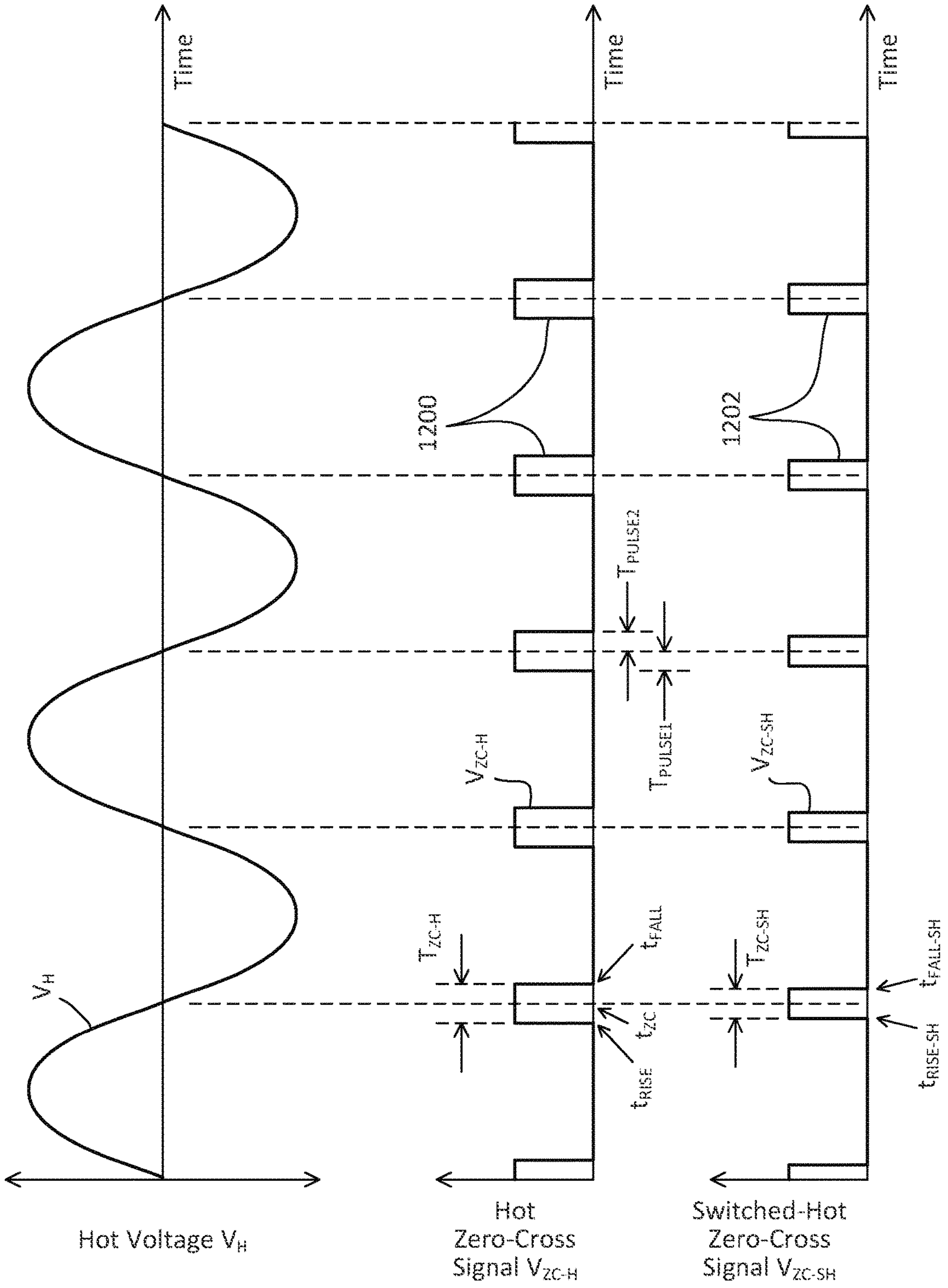
FIGS. 12-14 are diagrams illustrating example waveforms of the load control device of FIG. 11.
Figure 13:
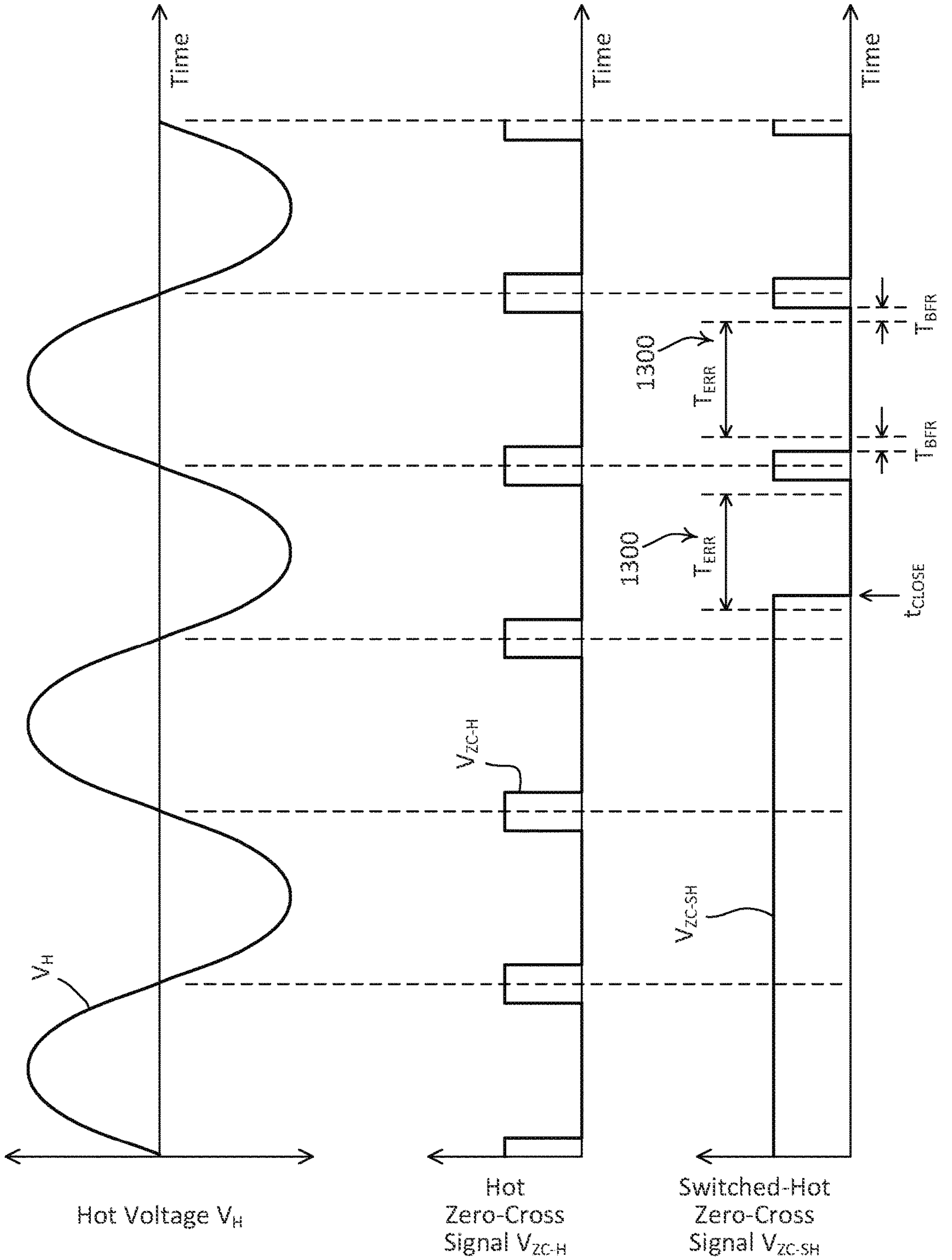
Figure 14:
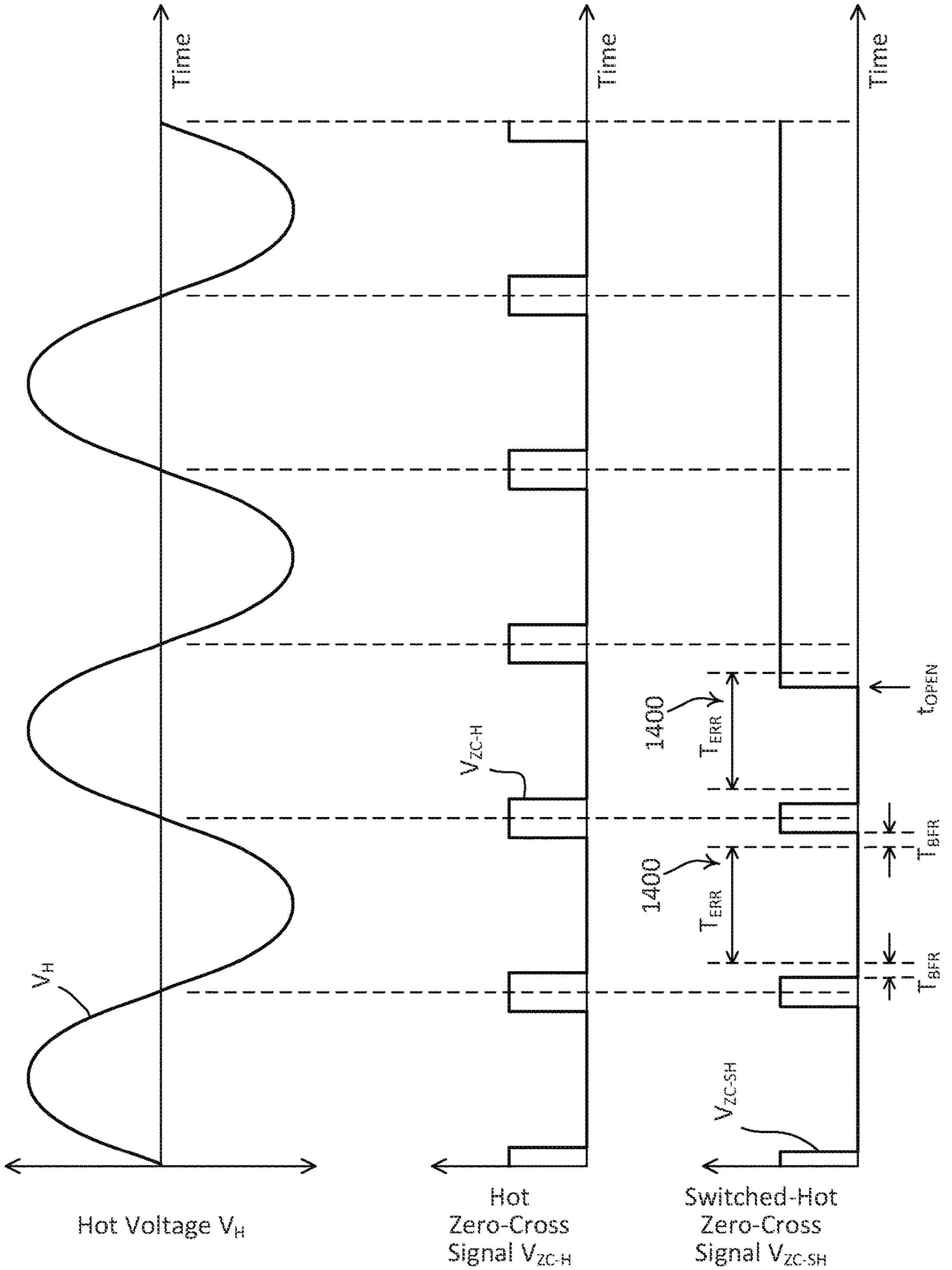

FIG. 11 is a simplified block diagram illustrating an example load control device 1100 (e.g., a switching module). FIGS. 12-14 illustrate example waveforms of the load control device 1110. The load control device 1100 may include a first load connection (e.g., a hot terminal H) adapted to be coupled to an AC power source 1102 for receiving a hot voltage $V_H$ and a second load connection (e.g., a switched-hot terminal SH) adapted to be coupled to an electrical load 1104 (e.g., but not limited to, a lighting load) for providing a switched-hot voltage $V_{SH}$ to the load. The load control device 1100 may include a neutral terminal N adapted to be coupled to the neutral side of the AC power source 1102. The load control device 1100 may include an earth ground connection adapted to be coupled to earth ground.

The load control device 1100 may include a controllably conductive device 1110 (e.g., but not limited to, a relay or the like) coupled in series electrical connection between the hot terminal H and the switched-hot terminal SH for controlling the power delivered to the lighting load. Alternatively or additionally, the controllably conductive device 1110 may include, for example a bidirectional semiconductor switch (such as, but not limited to, a triac, a FET in a rectifier bridge, two FETs in anti-series connection, or one or more insulated-gate bipolar junction transistors) or any other suitable switching circuit. The load control device 1100 may include a control circuit 1114 that may be operatively coupled to the controllably conductive device 1110 via a drive circuit 1112. The load control device 1100, for example via the control circuit 1114 and/or the drive circuit 1112, may render the controllably conductive device 1110 conductive and non-conductive to control the power delivered to the load 1104. For example, the control circuit 1114 may include a microcontroller, a programmable logic device (PLD), a microprocessor, an application specific integrated circuit (ASIC), a field-programmable gate array (FPGA), or any suitable processing device, controller, control circuit or the like.

As shown, the load control device 1100 may include one or more zero-cross detect circuits such as a hot zero-cross detector 1116 and/or a switched-hot zero-cross detector 1118. The hot zero-cross detector 1116 may be operatively coupled between the hot terminal H and the neutral terminal N. The switched-hot zero-cross detector 1118 be operatively coupled between switched-hot terminal SH and the neutral terminal N. The hot zero-cross detector 1116 may generate a hot zero-cross signal $V_{ZC-H}$ indicative of the zero-crossings of the hot voltage $V_H$. The zero-crossings of the hot voltage $V_H$ may correspond to the voltage zero crossings of the AC power source 1102. The switched-hot zero-cross detector 1118 may generate a switched-hot zero-cross signal $V_{ZC-SH}$ indicative of the zero-crossings of the switched-hot voltage $V_{SH}$. The control circuit 1114 may receive the hot zero-cross signal $V_{ZC-H}$ and the switched-hot zero-cross signal $V_{ZC-SH}$, and may render the controllably conductive device 1110 conductive and non-conductive based on the signal(s). The control circuit 1114 may calculate a zero-cross time $t_{ZC}$ of each zero-crossing of the hot voltage $V_H$ based on the hot zero-cross signal $V_{ZC-H}$ The control circuit 1114 may determine when the controllably conductive device 1110 should change its conductive state based on the switched-hot zero-cross signal $V_{ZC-SH}$.

The load control device 1100 may include a communication circuit 1120 for transmitting and/or receiving control signals or digital messages. For example, the communication circuit 1120 may include a wireless communication circuit, such as, a radio-frequency (RF) receiver for receiving RF signals, an RF transmitter for transmitting RF signals, an RF transceiver for transmitting and receiving RF signals, an infrared (IR) communication circuit or the like. Alternatively or additionally, the communication circuit 1120 may be operable to receive digital messages via a wired communication link, such as, for example, an Ethernet communication link, a digital addressable lighting interface (DALI) communication link, a power-line carrier (PLC) communication link, a 0-10V control link, or other suitable wired communication link. For example, the control circuit 1114 may be operable to receive control signals or digital messages from an external control device (such as, a remote control, an occupancy sensor, a vacancy sensor, or a daylight sensor) via the communication circuit 1120 and may control the controllably conductive device 1110 to turn the load 1104 on and off in response to the received control signals or digital messages.

The load control device 1100 may include a memory 1122 for storage and retrieval of operational data and characteristics of the load control device. The memory 1122 may include an external integrated circuit (IC) or as an internal circuit of the control circuit 1114. The load control device 1100 may include a power supply 1124 operatively coupled between the hot terminal H and the neutral terminal N for generating a DC supply voltage $V_{CC}$ for powering the control circuit 1114, the communication circuit 1120, the memory 1122, and other low-voltage circuitry of the load control device. The load control device 1100 may include one or more actuators (not shown) for providing manual inputs from a user, such that the control circuit could control the controllably conductive device 1110 to turn the load 1104 on and off in response to the manual inputs.

The control circuit 1114 may generate a drive signal $V_{DR}$, which may be provided to the drive circuit 1112 for rendering the controllably conductive device 1110 conductive and non-conductive. The timing of the drive signal $V_{DR}$ may be determined based on the zero-crossings of the hot voltage $V_H$ and/or the switched-hot voltage $V_{SH}$. For example, when the magnitude of the hot voltage $V_H$ is above a zero-cross voltage threshold $V_{ZC-TH}$ (e.g., approximately 28, 30, 32 volts or any other suitable value), the hot zero-cross detect circuit 1116 may drive the magnitude of the hot zero-cross signal $V_{ZC-H}$ low towards circuit common. The hot zero-cross detector 1116 may drive the magnitude of the hot zero-cross signal $V_{ZC-H}$ high towards the power supply voltage $V_{CC}$ when the magnitude of the hot voltage $V_H$ drops below the zero-cross voltage threshold $V_{ZC-TH}$. The hot zero-cross detector 1116 may drive the magnitude of the hot zero-cross signal $V_{ZC-H}$ low when the magnitude of the hot voltage $V_H$ rises back above the zero-cross voltage threshold $V_{ZC-TH}$.

Figure 19:
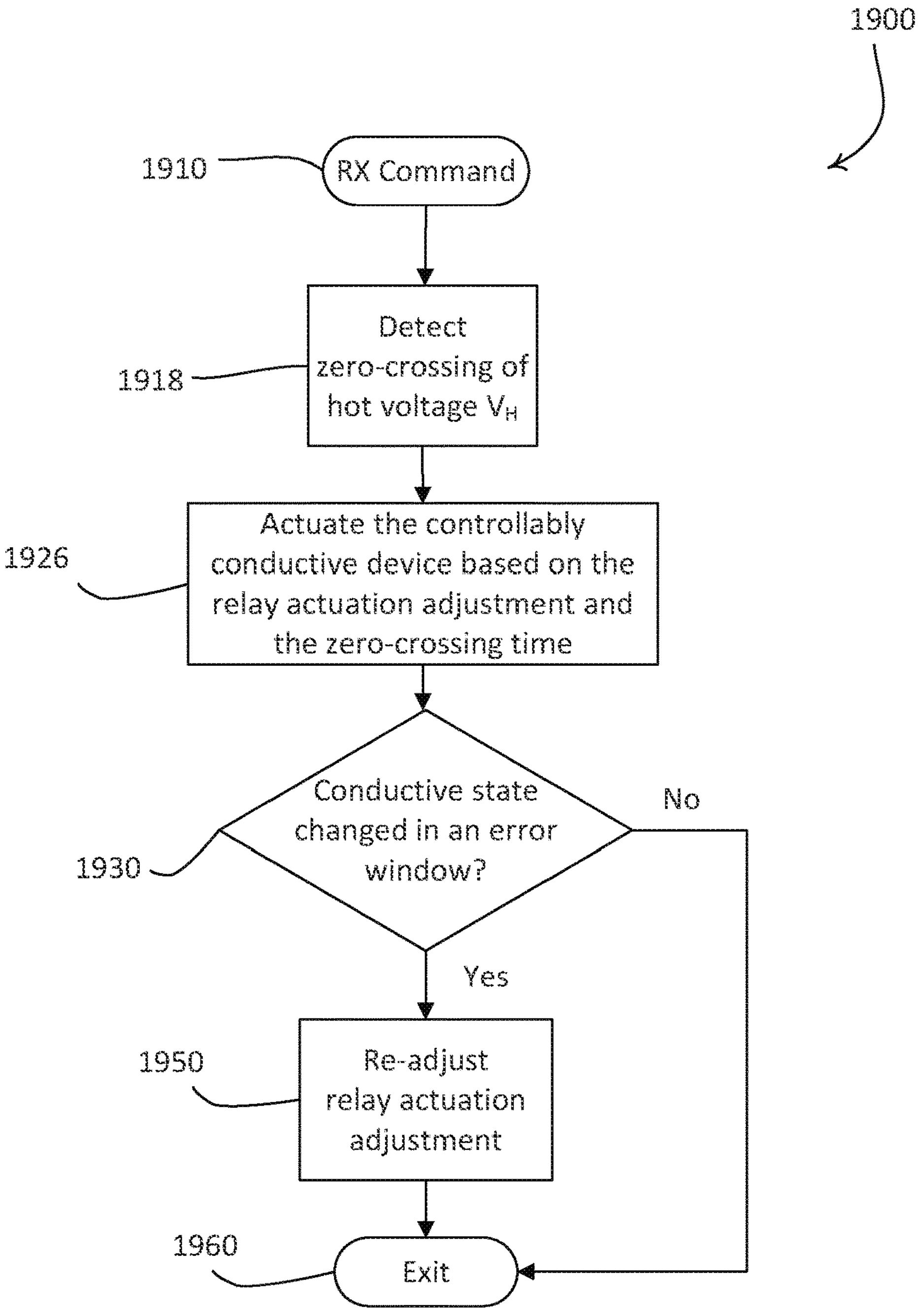
FIG. 19 shows a simplified flowchart of an example error detection procedure.

FIG. 19 shows an example procedure 1900 executed when a control circuit (e.g., the control circuit 1114) receives a command to control an electrical load. At 1910, the command to control the electrical load may be received. For example, the control circuit 1114 may receive a command via the communication circuit 1120 to turn the load 1104 on or off. At 1918, a zero crossing of the hot voltage $V_H$ may be detected. For example, the zero crossing of the hot voltage $V_H$ may be detected based on the rising and the falling edges of the hot zero-cross signal $V_{ZC-H}$ generated by the hot zero-cross detector 1116.

FIG. 12 illustrates how zero crossing(s) of the hot voltage $V_H$ may be detected. As shown in FIG. 12, the hot zero-cross detector 1116 may generate the hot zero-cross signal $V_{ZC-H}$ as a train of pulses 1200. A pulse 1200 may have a pulse width $T_{ZC-H}$ and may be centered about the respective zero-crossing of the hot voltage $V_H$ (e.g., symmetrical about the zero-crossing). For example, a first half-pulse width $T_{PULSE1}$ before the zero-crossing of a pulse 1200 may be approximately equal to a second half-pulse width $T_{PULSE2}$ after the zero-crossing as shown in FIG. 12. A zero-cross time $t_{ZC}$ may be determined based on the rising-edge time $t_{RISE}$ and the falling-edge time $f_{FALL}$ of the associated pulse. For example, the rising-edge time $t_{RISE}$ and a falling-edge time $f_{FALL}$ of the hot zero-cross signal $V_{ZC-H}$ of a pulse 1200 around the zero-crossing of the hot voltage $V_H$ may be used to calculate a zero-cross time $t_{ZC}$. The control circuit 1114 may include a microprocessor having an internal clock or timer for determining the rising-edge time $t_{RISE}$ and the falling-edge time $f_{FALL}$ of the hot zero-cross signal $V_{ZC-H}$. For example, the control circuit 1114 may determine the zero-cross time $t_{ZC}$ based on the midpoint or average of the rising-edge time $t_{RISE}$ and the falling-edge time $f_{FALL}$. For example, the zero-cross time $t_{ZC}$ may be calculated as follows:

$$t_{ZC}=t_{RISE}+\tfrac{1}{2}\cdot(t_{FALL}-t_{RISE}).$$

The pulse width $T_{ZC-H}$ of the pulses 1200 of the hot zero-cross signal $V_{ZC-H}$ may be dependent upon the amplitude of the hot voltage $V_H$. The pulse width $T_{ZC-H}$ of the pulses 1200 of the hot zero-cross signal $V_{ZC-H}$ may be dependent upon the values of the electrical components of the hot zero-cross detector 1116 (e.g., due to the tolerances of the components). As a result, the pulse width $T_{ZC-H}$ of the hot zero-cross signal $V_{ZC-H}$ may vary from one zero-cross detector to the next and/or from one installation of the load control device 1100 to the next. The pulse width $T_{ZC-H}$ may change over time as the electrical components of the hot zero-cross detect circuit 1116 age and change in value. By calculating the zero-cross time $t_{ZC}$ as the midpoint or average of the rising-edge time $t_{RISE}$ and the falling-edge time $f_{FALL}$, the zero-cross time $t_{ZC}$ may be independent of the amplitude of the hot voltage $V_H$ and the values of the components of the zero-cross detector 1116. Accordingly, the determination of the zero-cross time $t_{ZC}$ may be substantially consistent across the lifetime of the load control device 1100, from one zero-cross detector to the next, and/or from one installation of the load control device to the next.

The relay actuation time may be determined based on the zero-cross time of the hot voltage $V_H$. For example, the control circuit 1114 may use the zero-cross time $t_{ZC}$ to determine when to adjust the drive signal $V_{DR}$ to render the controllably conductive device 1110 conductive or non-conductive at the appropriate times.

The switched-hot zero-cross detector 1118 may generate the switched-hot zero-cross signal $V_{ZC-SH}$ in response to the switched-hot voltage $V_{SH}$ in a similar manner as the hot zero-cross detector 1116 generates the hot zero-cross signal $V_{ZC-H}$ in response to the hot voltage $V_H$. A pulse 1202 of the switched-hot zero-cross signal $V_{ZC-SH}$ may have a pulse width $T_{ZC-SH}$ and may be centered about the respective zero-crossing of the switched-hot voltage $V_{SH}$. Since the magnitude of the hot voltage $V_H$ and the switched-hot voltage $V_{SH}$ are approximately equal when the controllably conductive device 1110 is closed, the magnitudes of the hot zero-cross signal $V_{ZC-H}$ and the switched-hot zero-cross signal $V_{ZC-SH}$ may be substantially the same at this time (e.g., as shown in FIG. 12). However, differences in the hardware of the hot zero-cross detector 1116 and the switched-hot zero-cross detector 1118 may cause the hot zero-cross signal $V_{ZC-H}$ and the switched-hot zero-cross signal $V_{ZC-SH}$ to differ slightly. Since the hot zero-cross detector 1116 may generate the pulses 1200 of the hot zero-cross signal $V_{ZC-H}$ independent of the state of the controllably conductive device 1110, the control circuit 1114 may use the hot zero-cross signal $V_{ZC-H}$ as a reference signal (e.g., to generate the zero-cross times $t_{ZC}$ of the hot voltage $V_H$ as described above).

The hot zero-cross detector 1116 may drive the magnitude of the hot zero-cross signal $V_{ZC-H}$ high, thereby generating a rising edge, when the magnitude of the hot voltage $V_H$ drops below a first zero-cross voltage threshold. The hot zero-cross detector 1116 may drive the magnitude of the hot zero-cross signal $V_{ZC-H}$ low again when the magnitude of the hot voltage $V_H$ rises back above a second zero-cross voltage threshold. When the first and the second thresholds are the same or substantially the same, the pulses 1200 of the hot zero-cross signal $V_{ZC-H}$ may be centered about the respective zero-crossing of the hot voltage $V_H$. The pulses 1200 of the hot zero-cross signal $V_{ZC-H}$ may be symmetrical about the zero-crossings. When the first and the second thresholds are different, the pulses 1200 of the hot zero-cross signal $V_{ZC-H}$ may not be centered about the respective zero-crossing of the hot voltage $V_H$. Similarly, the pulses 1200 of the hot zero-cross signal $V_{ZC-H}$ may not be symmetrical about the zero-crossings. The pulses of 1202 of the switched-hot zero-cross signal $V_{ZC-SH}$ may not be symmetrical about the zero-crossings. The zero-cross time $t_{ZC}$ may be determined as a function of the rise and falling-edge times and their respective voltage thresholds. For example, the hot zero-cross detect circuit 1116 may use a first voltage threshold $V_{TH1}$ when the magnitude of the hot voltage $V_H$ in the positive half-cycles of the hot voltage $V_H$ and a second voltage threshold $V_{TH2}$ in the negative half-cycles. If the first voltage threshold $V_{TH1}$ is different than the second voltage threshold $V_{TH2}$, the pulses of the hot zero-cross signal $V_{ZC-H}$ may not be centered about the respective zero-crossing. The control circuit 1114 may calculate the zero-cross time $t_{ZC}$ as a function of the rise and falling-edge times $t_{RISE}$, $t_{FALL}$ and the first and second voltage thresholds $V_{TH1}$, $V_{TH2}$. For example, the zero-cross time $t_{ZC}$ may be calculated as follows:

$$t_{ZC}=t_{RISE}+[V_{TH1}/(V_{TH1}+V_{TH2})]\cdot(t_{FALL}-t_{RISE}),$$

if the magnitude of the hot voltage $V_H$ is transitioning from the positive to negative half-cycles during the zero-crossing, or $$t_{ZC}=t_{RISE}+[V_{TH2}/(V_{TH1}+V_{TH2})]\cdot(t_{FALL}-t_{RISE}),$$

if the magnitude of the hot voltage $V_H$ is transitioning from the negative to positive half-cycles during the zero-crossing.

Turning back to FIG. 19, at 1926, the controllably conducted device 1110 may be actuated. The actuation time may be determined based on a relay actuation adjustment time period and the time associated with the detected zero-crossing. For example, the control circuit may determine the time to adjust the drive voltage $V_{DR}$ based on the relay actuation adjustment time period and the time of the zero-crossing detected at 1918.

For example, when the control circuit 1114 receives a command to turn on the load 1104 (e.g., via the communication circuit), the control circuit 1114 may attempt to cause the controllably conductive device 1110 to become conductive (e.g., to close) as close as possible to (but slightly prior to) a subsequent zero-crossing of the AC power source 1102 to minimize arcing in the relay. The control circuit 1114 may attempt to close the relay slightly before the subsequent zero-crossing to account for bouncing in the controllably conductive device 1110 as described herein with reference to FIG. 3. When the control circuit 1114 receives a command to turn off the load 1104, the control circuit 1114 attempts to cause the controllably conductive device 1110 to become non-conductive (e.g., to open) before a subsequent zero-crossing. This may prevent the relay from remaining conductive into the next half-cycle and, for example, remaining conductive through the next half-cycle due to arcing the relay.

The control circuit 1114 may determine a relay actuation adjustment time period. For turn-on operations (e.g., relay closing operations), the control circuit 1114 may determine a relay close actuation adjustment time period. The relay close actuation adjustment time period may be indicative of a time at which the drive voltage is adjusted relative to a target zero-crossing for rendering the controllably conductive device conductive. The relay actuation adjustment time period may be determined based on a turn-on delay time period $T_{TURN\text{-}ON}$. A turn-on delay time period $T_{TURN\text{-}ON}$ may correspond to the time period between when the control circuit 1114 drives the drive signal $V_{DR}$ high and the controllably conductive device 1110 becomes conductive. The turn-on delay time period $T_{TURN\text{-}ON}$ may correspond to the relay-actuation delay time period and/or the relay close delay time period as described herein with respect to FIGS. 1-10.

For turn-off operations (e.g., relay opening operations), the control circuit 1114 may determine a relay open actuation adjustment time period that may be indicative of a time at which the drive voltage may be adjusted relative to a target zero-crossing for rendering the controllably conductive device non-conductive. The relay actuation adjustment time period may be determined based on a turn-off delay time period $T_{TURN\text{-}OFF}$. A turn-off delay time period $T_{TURN\text{-}OFF}$ may correspond to the time period between when the control circuit 1114 drives the drive signal $V_{DR}$ low and the controllably conductive device 1110 becomes non-conductive. The control circuit 1114 may drive the drive signal $V_{DR}$ high at a time that is approximately the length of the turn-on delay time period $T_{TURN\text{-}ON}$ before a subsequent zero-crossing (e.g., a target zero-crossing) when turning the load 1104 on (e.g., as shown in FIGS. 4, 7, and 8). The control circuit 1114 may drive the drive signal $V_{DR}$ low at a time that is approximately the length of the turn-off delay time period $T_{TURN\text{-}OFF}$ plus an additional offset period before a subsequent zero-crossing when turning the load 1104 off.

The values of the turn-on delay time period $T_{TURN\text{-}ON}$ and the turn-off delay time period $T_{TURN\text{-}OFF}$ may change over time, for example, as the load control device 1100 ages. The control circuit 1114 may adaptively change the times at which the control circuit drives the drive signal $V_{DR}$ high or low to render the controllably conductive device 1110 conductive and non-conductive. For example, the relay actuation adjustment time period(s) for open and/or close operations may be updated upon detecting an error in the closing or opening times.

Turning back to FIG. 19, at 1930, whether the relay changes its conductive state in an error window may be determined. The error window may be dynamically set based on the falling edge and/or the rising edge of the switched-hot zero-cross signal $V_{ZC\text{-}SH}$.

The control circuit 1114 may determine whether an error in the closing and/or opening times has occurred based on a dynamically-set error detection window. The switched-hot zero-cross detector 1118 may drive the switched-hot zero-cross signal $V_{ZC\text{-}SH}$ high during a pulse 1202 while the controllably conductive device 1110 is closed. For example, the switched-hot zero-cross detector 1118 may drive the switched-hot zero-cross signal $V_{ZC\text{-}SH}$ high when the magnitude of the switched-hot voltage $V_{SH}$ is below the voltage thresholds of the switched-hot zero-cross detector 1118 during the pulse width $T_{ZC\text{-}SH}$ shown in FIG. 12. If the control circuit 1114 detects that the relay closes or opens outside of a pulse 1202 of the switched-hot zero-cross signal $V_{ZC\text{-}SH}$, the control circuit 1114 may determine an error in the closing or opening times, respectively.

The control circuit 1114 may determine whether an error in the relay closing time has occurred. The control circuit 1114 may determine whether the relay changes its conductive state from non-conductive to conductive in a close error detection window. FIG. 13 illustrates example waveforms of the load control device 1100. The control circuit 1114 may monitor the switched-hot zero-cross signal $V_{ZC\text{-}SH}$ during a close error detection window 1300. The close error detection window 1300 may be associated with an error detection window length $T_{ERR}$, and may be located between the pulses 1202 of the switched-hot zero-cross signal $V_{ZC\text{-}SH}$. If the control circuit 1114 detects that the magnitude of the switched-hot zero-cross signal $V_{ZC\text{-}SH}$ goes low during the close error detection window 1300, the control circuit may determine that an error in the relay closing time has occurred. The relay actuation adjustment associated with the relay close operation (e.g., relay close actuation adjustment) may be adjusted. For example, the value of the turn-on delay time period $T_{TURN\text{-}ON}$ may be adjusted to attempt to close the controllably conductive device 1110 as close as possible to (but slightly prior to) a subsequent zero-crossing (e.g., as shown in FIG. 6).

The control circuit 1114 may determine whether an error in the relay opening time has occurred based on a dynamically-set open error detection window. The control circuit 1114 may determine whether the relay changes its conductive state from conductive to non-conductive in the open error detection window. FIG. 14 illustrates example waveforms of the load control device 1100. The control circuit 1114 may monitor the switched-hot zero-cross signal $V_{ZC\text{-}SH}$ during an open error detection window 1400. If the control circuit 1114 detects that the magnitude of the switched-hot zero-cross signal $V_{ZC\text{-}SH}$ goes high during an open error detection window 1400, the control circuit may determine that an error in the relay opening time has occurred. The relay actuation adjustment associated with the relay open operation (e.g., relay open actuation adjustment) may be adjusted. For example, the value of the turn-off delay time period $T_{TURN\text{-}OFF}$ to attempt to close the controllably conductive device 1110 just before a subsequent zero-crossing. The close error detection window 1300 for relay closing operations and the open error detection window 1400 for relay opening operations may coincide with each other (e.g., may be the same).

An error detection window, such as the close error detection window 1300 and the open error detection window 1400 may be dynamically adjusted. For example, the start and/or end times of the error detection time window may be dynamically set based on the rising-edge time $t_{RISE-SH}$ and the falling-edge time $t_{FALL-SH}$ of the switched-hot zero-cross signal $V_{ZC-SH}$.

The pulse width $T_{ZC-SH}$ of the switched-hot zero-cross signal $V_{ZC-SH}$ may be dependent upon the amplitude of the switched-hot voltage $V_{SH}$ and the values of the components of the switched-hot zero-cross detector 1118 (e.g., due to the tolerances of the components). The pulse width $T_{ZC-SH}$ of the switched-hot zero-cross signal $V_{ZC-SH}$ can vary from one manufactured load control device 1100 to the next and/or from one installation of the load control device to the next. The control circuit 1114 may dynamically set the start and end times of the error detection window 1300 such that the error detection window may fall outside of the pulses 1202 (e.g., fall between the pulses) of the switched-hot zero-cross signal $V_{ZC-SH}$.

The control circuit 1114 may set the start and end times of the close error detection window 1300 based on the rising-edge time $t_{RISE-SH}$ and the falling-edge time $t_{FALL-SH}$ of the switched-hot zero-cross signal $V_{ZC-SH}$. When the controllably conductive device 1110 is closed, the control circuit 1114 may measure a rising-edge time $t_{RISE-SH}$ and a falling-edge time $t_{FALL-SH}$ of the switched-hot zero-cross signal $V_{ZC-SH}$ (as shown in FIG. 12) and may store these times in the memory 1122. The control circuit 1114 may set the start time of the error detection window 1300 to be a buffer time period $T_{BFR}$ after the falling-edge time $t_{FALL-SH}$ of a pulse 1202. The control circuit 1114 may set the end time of the error detection time window to be the buffer time period $T_{BFR}$ before the rising-edge time $t_{RISE-SH}$ of the next pulse. The buffer time period $T_{BFR}$ may be a predetermined time period and may include approximately 300, 350, 400, 450, 500 microseconds or any suitable value). The error detection window length $T_{ERR}$ of the error detection window 1300 may change dynamically and may range, for example, from approximately five to nine milliseconds if the AC power source 1102 is operating at 50 Hz. The control circuit 1114 may set the start and end times of the open error detection window 1400 similarly.

The rising-edge time $t_{RISE-SH}$ and the falling-edge time $t_{FALL-SH}$ of the switched-hot zero-cross signal $V_{ZC-SH}$ may be measured relative to the hot zero-cross signal $V_{ZC-H}$. The rising-edge time $t_{RISE-SH}$ and the falling-edge time $t_{FALL-SH}$ may be measured relative to the zero-cross times $t_{ZC}$ of the pulses 1200 of the hot zero-cross signal $V_{ZC-H}$. For example, when the controllably conductive device 1110 is open, the control circuit 1114 may determine when to begin and stop monitoring the switched-hot zero-cross signal $V_{ZC-SH}$ based on the zero-cross times $t_{ZC}$ of the pulses 1200 of the hot zero-cross signal $V_{ZC-H}$. For example, when the control circuit 1114 does not receive the pulses 1202 of the switched-hot zero-cross signal $V_{ZC-SH}$, the control circuit 1114 may determine when to begin and stop monitoring the switched-hot zero-cross signal $V_{ZC-SH}$ based on the zero-cross times $t_{ZC}$ of the pulses 1200 of the hot zero-cross signal $V_{ZC-H}$.

The control circuit 1114 may monitor the switched-hot zero-cross signal $V_{ZC-SH}$ during separate close and open error detection windows to detect errors in the closing and opening times, respectively. The control circuit 1114 may be operable to dynamically set the beginning and end times of each of the close and open error detection time windows, such that the close error detection time window occurs after each pulse 1202 of the switched-hot zero-cross signal $V_{ZC-SH}$ and the open error detection time window occurs before each pulse 1202 of the switched-hot zero-cross signal $V_{ZC-SH}$. The control circuit 1114 may set the start time of the close error detection time window to be a buffer time period (e.g., approximately 400 microseconds) after the falling-edge time $t_{FALL-SH}$ and set the end time of the close error detection time window to be a close error detection time window length (e.g., approximately five milliseconds) after the start time. The control circuit 1114 may set the end time of the open error detection time window to be a buffer time period (e.g., approximately 400 microseconds) before the rising-edge time $t_{RISE-SH}$ and set the start time of the open error detection time window to be an open error detection time window length (e.g., approximately five milliseconds) before the end time.

Turning back to FIG. 19, if it is determined that the relay conductive state changed within the error window, the relay actuation adjustment time period may be adjusted at 1950. The relay actuation adjustment time period may be adjusted as described herein, for example, with respect to FIGS. 6-10. If it is determined that the relay conductive state changed outside of the error detection window, the procedure may exit.

Figure 15:
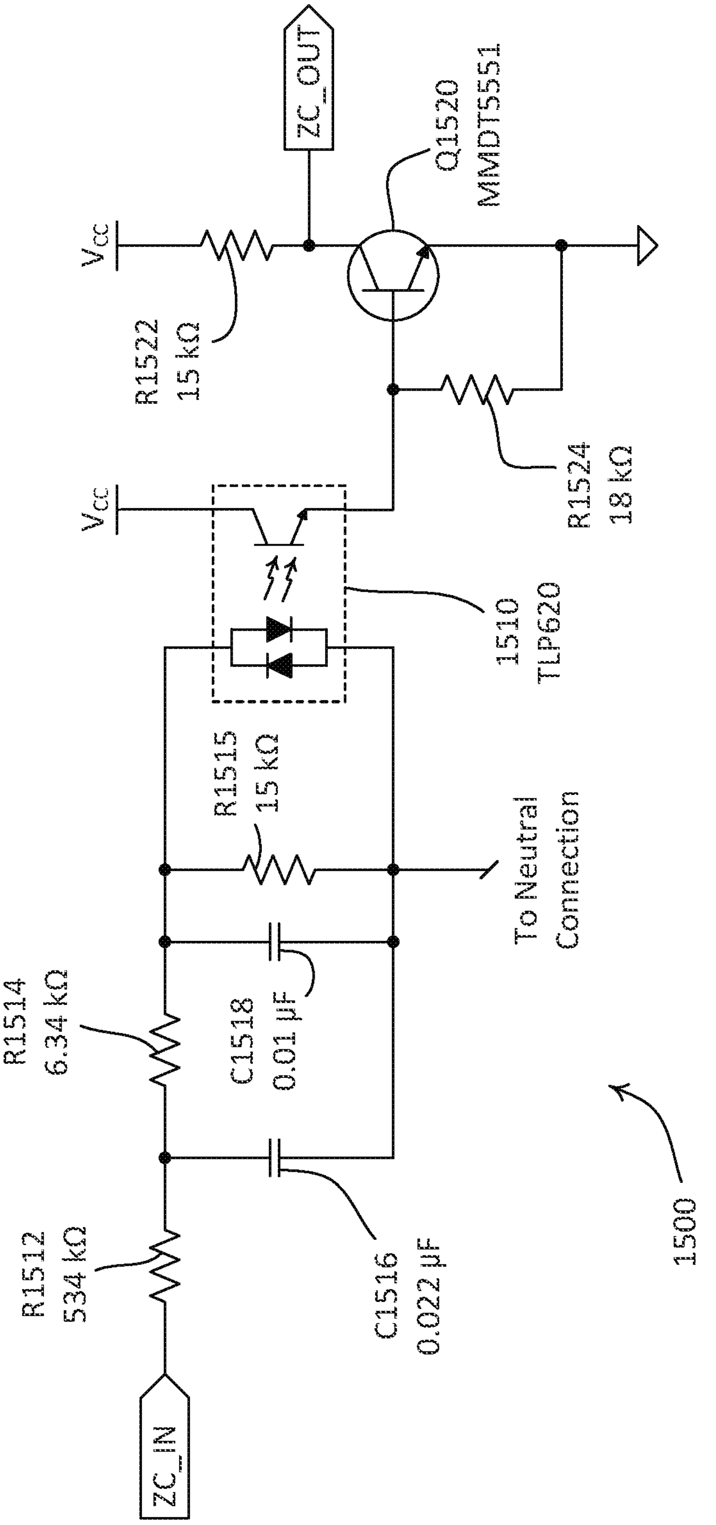
FIG. 15 is a simplified schematic diagram of an example zero-cross detect circuit.

FIG. 15 shows an example of a zero-cross detect circuit 1500 (e.g., the hot zero-cross detector 1116 and/or the switched-hot zero-cross detector 1118 of the load control device 1100 shown in FIG. 11). The zero-cross detect circuit 1500 may include a zero-cross input ZC_IN for receiving an AC voltage (e.g., the hot voltage $V_H$ or the switched hot voltage $V_{SH}$) and a zero-cross output ZC_OUT for providing a zero-cross signal (e.g., the hot zero-cross signal $V_{ZC-H}$ or the switched-hot zero-cross signal $V_{ZC-SH}$). The zero-cross detect circuit 1500 may include an optocoupler 1510 having two input photodiodes coupled in anti-parallel connection and an output phototransistor. The two input photodiodes of the optocoupler 1510 may be operable to receive the AC voltage via a filter network comprising resistors R1512, R1514, R1515 and capacitors C1516, C1518. The filter network may operate to scale the AC voltage down to a magnitude appropriate to be received by the two input photodiodes of the optocoupler 1510.

The output phototransistor of the optocoupler 1510 may be operatively coupled between a DC supply voltage (e.g., Vcc) and the base of a bipolar junction transistor Q1520. The collector of the transistor Q1520 may be operatively coupled to the DC supply voltage via a resistor R1522 and the emitter of the transistor is coupled to circuit common. A resistor R1524 may be operatively coupled between the base and emitter of the transistor Q1520. The values and part numbers provided on FIG. 15 are provided as examples only and should not limit the scope of the present invention.

When the magnitude of the AC voltage at the zero-cross input ZC_IN exceeds a zero-cross voltage threshold $V_{ZC-TH}$, the input photodiodes of the optocoupler 1510 may begin to conduct, such that the output phototransistor is rendered conductive. Accordingly, the base of the transistor Q1520 may be pulled up towards the DC supply voltage, such that the transistor Q1520 is rendered conductive and the zero-cross signal at the zero-cross output ZC_OUT is pulled down towards circuit common (e.g., at a first half-pulse width $T_{PULSE1}$ from the zero-crossing of the AC signal as shown in FIG. 12). When the magnitude of the AC voltage at the zero-cross input ZC_IN drops below the zero-cross voltage threshold $V_{ZC-TH}$, the transistor Q1520 may be rendered non-conductive and the zero-cross signal at the zero-cross output ZC_OUT is driven high towards the DC supply voltage (e.g., at a second half-pulse width $T_{PULSE2}$ from the zero-crossing of the AC signal as shown in FIG. 12). Since the two input photodiodes of the optocoupler 1510 may be located on the same integrated circuit and fabricated from the same semiconductor die, the first half-pulse width $T_{PULSE1}$ before the zero-crossing and the second half-pulse width $T_{PULSE2}$ after the zero-crossing may be substantially the same. For example, the pulses of the zero-cross signal generated by the zero-cross detect circuit 1500 may be symmetrical above a zero-crossing. A control circuit receiving the zero-cross signal may be operable to record the times of the rising and falling edges (e.g., at the rising-edge time $t_{RISE}$ and the falling-edge time $t_{FALL}$) of a pulse of the zero-cross signal and may determine the time of the zero-crossing (e.g., the zero-cross time $V_{ZC}$) using both the times of the rising and falling edges. For example, the control circuit may determine the midpoint or average of the times of the rising and falling edges to determine the time of the zero-crossing.

Figure 16:
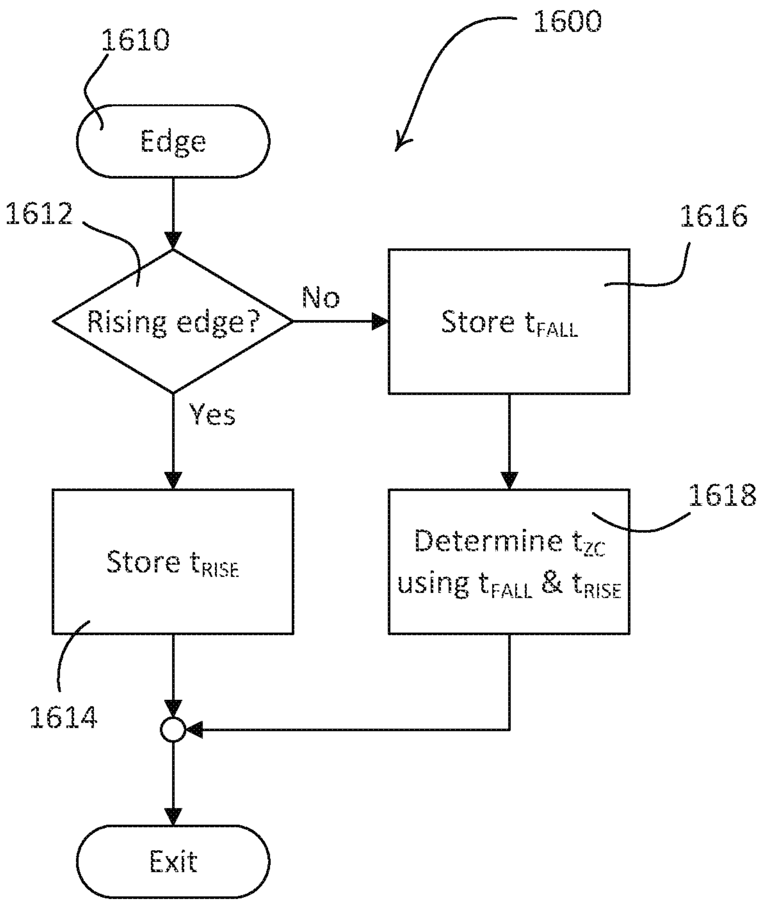
FIG. 16 is a simplified flowchart of an example zero-cross signal edge procedure.

FIG. 16 shows an example zero-cross signal edge procedure 1600. At 1610, an edge of a zero-cross signal may be detected. For example, the control circuit 1114 may detect a rising or falling edge of the hot zero-cross signal $V_{ZC-H}$. Whether the detected edge is a rising edge may be determined at 1612. If the detected edge is a rising edge, the control circuit may store the rising-edge time $t_{RISE}$ in memory at 1614 (e.g., by storing the present value of an internal timer of a microprocessor of the control circuit), and the zero-cross signal edge procedure 1600 may exit. If the detected edge is a falling edge, the control circuit may store the falling-edge time $t_{FALL}$ at 1616. At 1618, the zero-cross time $t_{ZC}$ may be determined based on both the rising-edge time $t_{RISE}$ and the falling-edge time $t_{FALL}$. For example, the control circuit 1114 may determine the zero-cross time $t_{ZC}$ by calculating the midpoint or average of the rising-edge time $t_{RISE}$ and the falling-edge time $t_{FALL}$.

Figure 17:
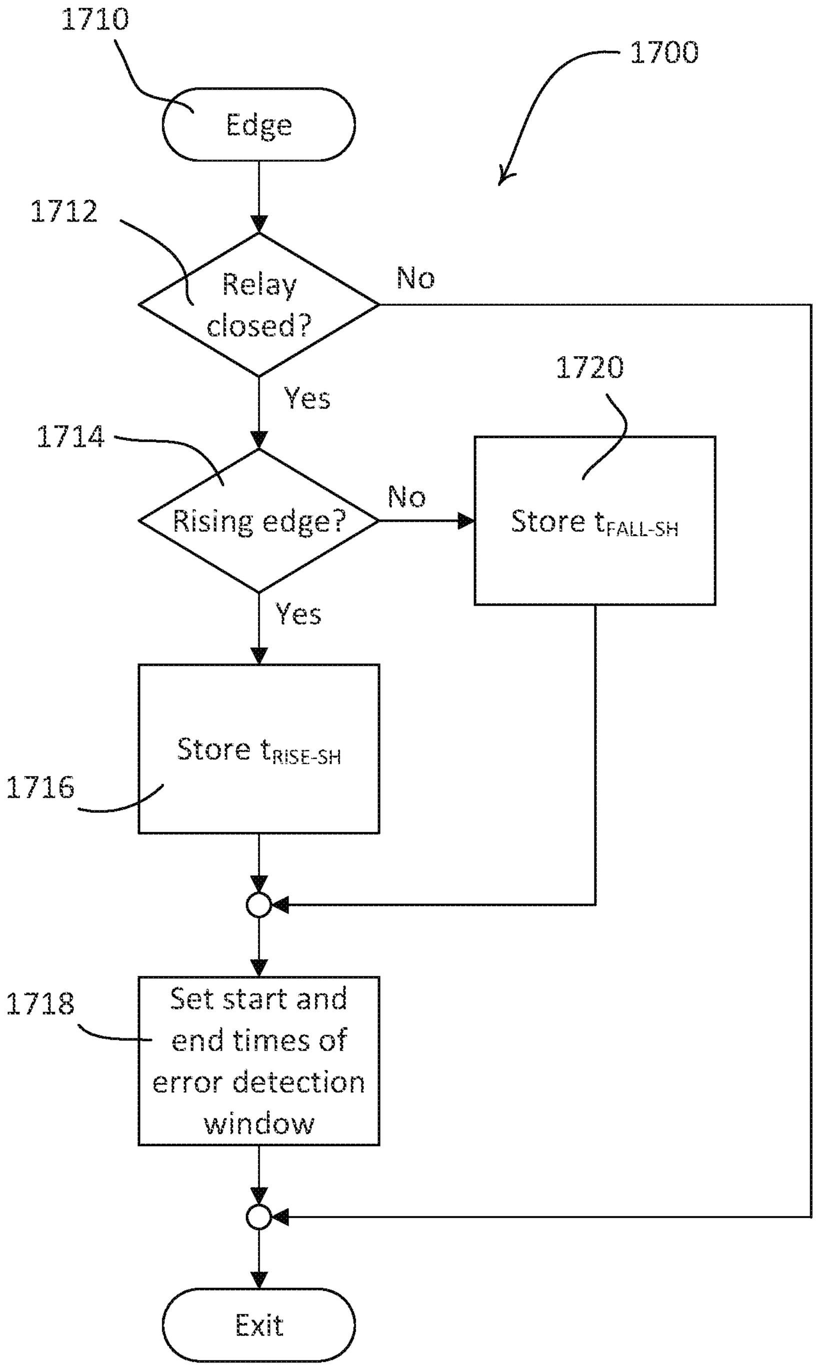
FIG. 17 is a simplified flowchart of an example switched-hot zero-cross signal edge procedure.

FIG. 17 shows an example switched-hot zero-cross signal edge procedure 1700. At 1710, an edge of a switched-hot zero-cross signal may be detected. For example, the control circuit 1114 may detect a rising or falling edge of the switched hot zero-cross signal $V_{ZC-SH}$. In an embodiment, the switched-hot zero-cross signal edge procedure 1700 may be executed when the controllably conductive device 1110 is open or closed. In an embodiment, the switched-hot zero-cross signal edge procedure 1700 may only be executed when the controllably conductive device 1110 is closed. At 1712, whether the controllably conductive device 1110 is closed may be determined. If the controllably conductive device 1110 is open, the switched-hot zero-cross signal edge procedure 1700 may exit. If the controllably conductive device 1110 is closed, at 1714, whether the detected edge is a rising edge may be determined. If the detected edge is a rising edge, the control circuit may store the rising-edge time $t_{RISE-SH}$ in memory at 1716. The control circuit may store the rising-edge time $t_{RISE-SH}$ as compared to the zero-cross time $t_{ZC}$ of the hot zero-cross signal $V_{ZC-H}$. The control circuit may set the start and end times of one or more error detection windows at 1718, and the switched-hot zero-cross signal edge procedure 1700 may exit. If the detected edge is a falling edge, the control circuit may store the falling-edge time $t_{FALL-SH}$ at 1720 (e.g., as compared the zero-cross time $t_{ZC}$ of the hot zero-cross signal $V_{ZC-H}$), and may dynamically set the start and end times of one or more error detection windows at 1718 based on the rising-edge time $t_{RISE-SH}$ and the falling-edge time $t_{FALL-SH}$.

For example, the control circuit may set the start and end times of each error detection window to be the buffer time period $T_{BFR}$ away from the pulses 1202 of the switched-hot zero-cross signal $V_{ZC-SH}$ (using the values of the rising-edge time $t_{RISE-SH}$ and the falling-edge time $t_{FALL-SH}$ of the switched-hot zero-cross signal $V_{ZC-SH}$ stored in the memory 1122) as described herein. The control circuit may be frequently measuring the rising-edge time $t_{RISE-SH}$ and the falling-edge time $t_{FALL-SH}$ of the switched-hot zero-cross signal $V_{ZC-SH}$ during the switched-hot zero-cross signal edge procedure 1700. The control circuit may dynamically set the start and end times of the error detection window(s) when the rising-edge and falling-edge times $t_{RISE-SH}$, $t_{FALL-SH}$ of the switched-hot zero-cross signal $V_{ZC-SH}$ change as compared to the zero-cross time $t_{ZC}$ of the hot zero-cross signal $V_{ZC-H}$.

Figure 18A:
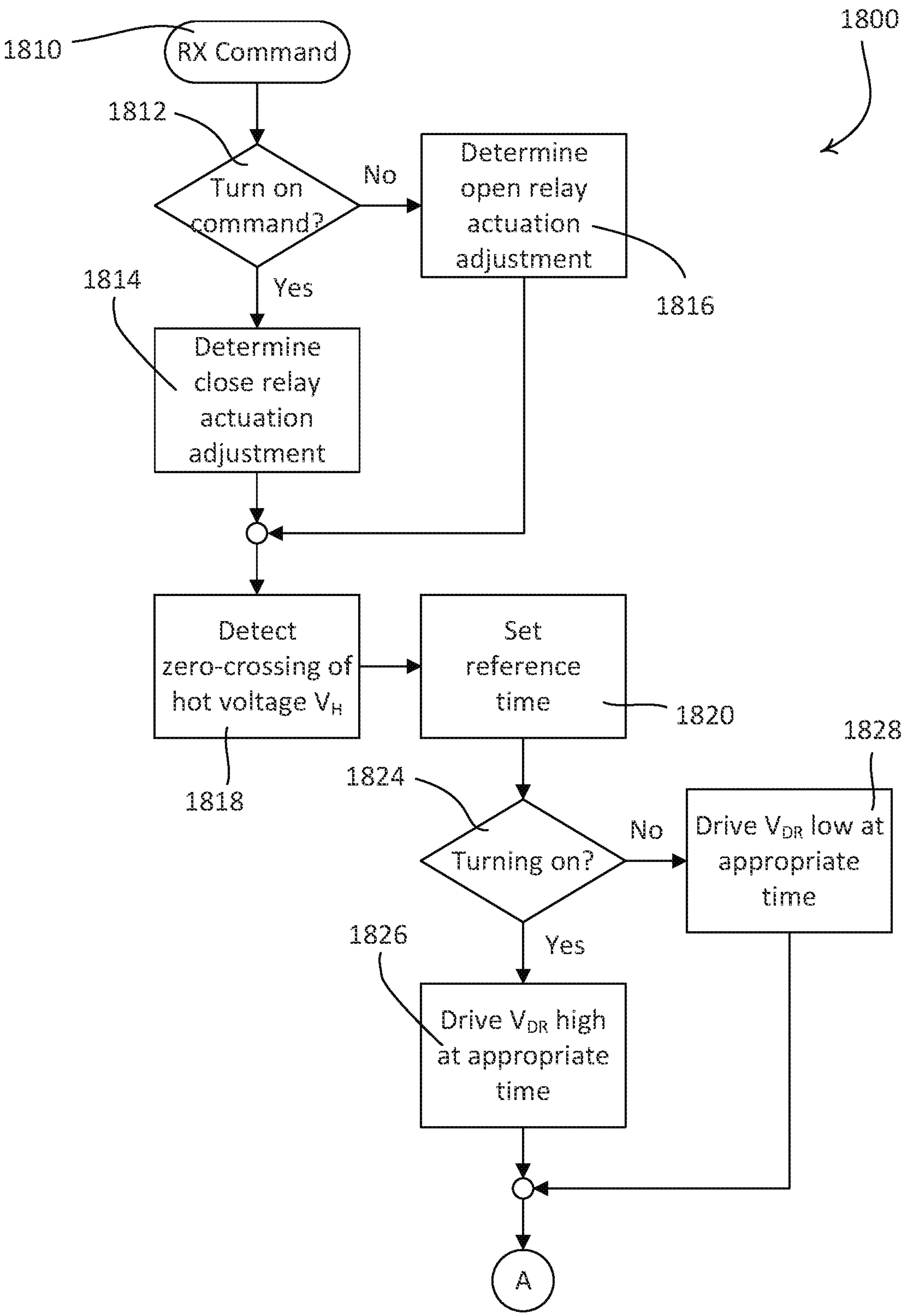
FIGS. 18A and 18B show a simplified flowchart of an example toggle procedure.
Figure 18B:
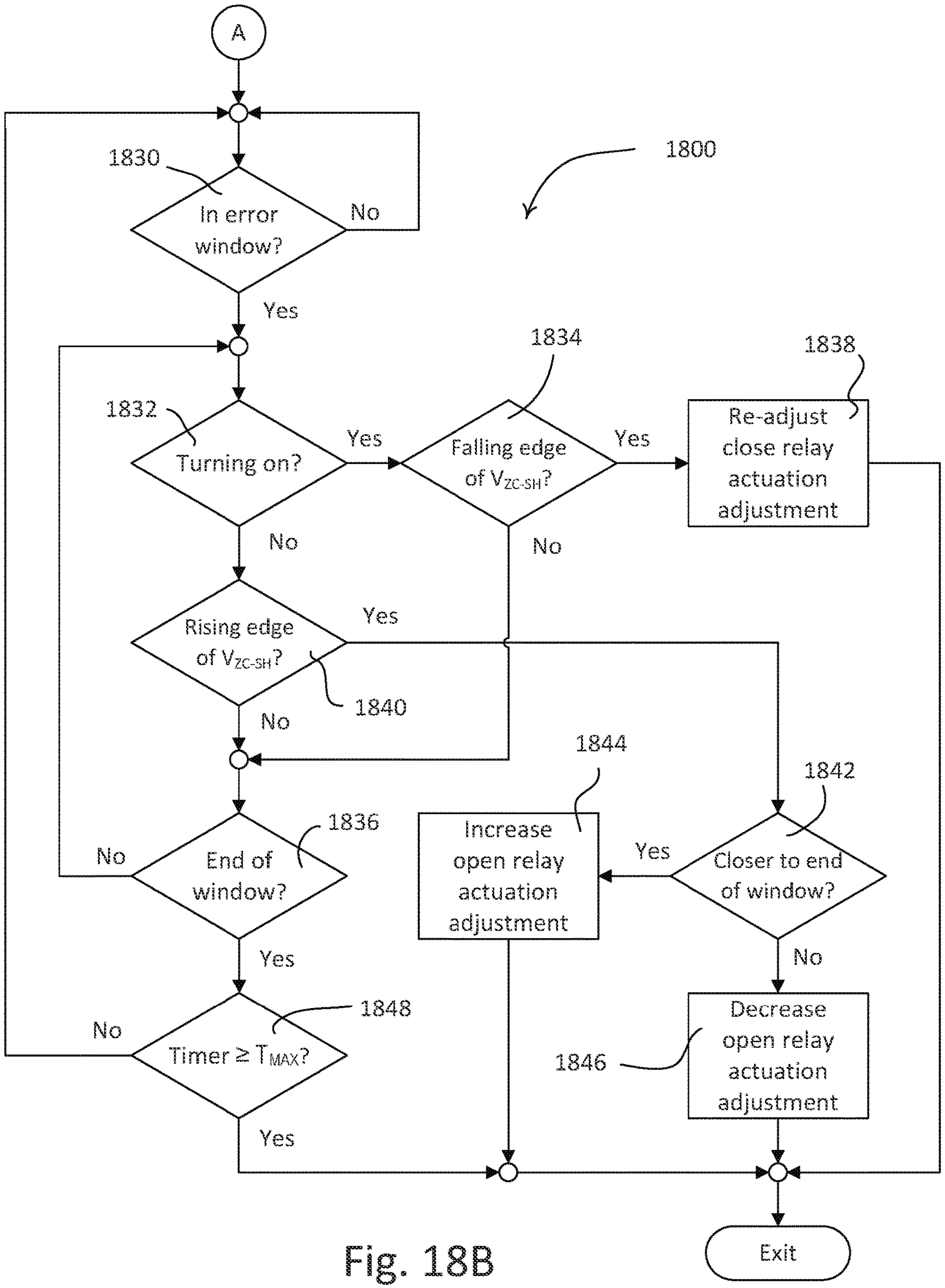

FIGS. 18A and 18B show a simplified flowchart of an example toggle procedure 1800. At 1810, a control circuit may receive a command to control an electrical load. For example, the control circuit 1114 may receive a command via the communication circuit 1120 to turn the load 1104 on or off. At 1812, whether the received command is a command to turn on the electrical load may be determined. If the control circuit has received a turn-on command, at 1814, the control circuit may determine, a close relay actuation adjustment time period. The close relay actuation adjustment time period may be indicative of the time interval between a detected zero-crossing and when a relay closure is initiated in order to close the relay as close as possible to (but slightly prior to) a subsequent zero-crossing (e.g., as in 402, 404, 406 of the method of FIG. 4). For example, the close relay actuation adjustment time period may be determined based on the turn-on delay time period $T_{TURN-ON}$ as described herein. The close relay actuation adjustment time period may correspond to the relay actuation adjustment 370 of FIG. 3.

If the control circuit has received a command to turn off the electrical load, the control circuit may determine, at 1816, an open relay actuation adjustment time period. The open relay actuation adjustment time period may be indicative of the time interval between a detected zero-crossing and when the drive signal $V_{DR}$ is adjusted in order to open the relay before a subsequent zero-crossing. For example, the open relay actuation adjustment time period may be determined based on the turn-off delay time period $T_{TURN-OFF}$ as described herein. The open relay actuation adjustment time period may correspond to the relay actuation adjustment described herein, such as the relay actuation adjustment time period 2050 of FIG. 20 and the relay actuation adjustment time period 2150 of FIG. 21.

As shown, at 1818, the control circuit may detect a zero-crossing of the hot voltage $V_H$ (e.g., as in 408 of the method of FIG. 4). Upon detecting the zero-crossing, the control circuit may set a reference time to be equal to the present value of a timer (e.g., an internal timer of a microprocessor) at 1820. If it is determined that the control circuit is turning on the electrical load at 1824, the control circuit may adjust the drive voltage $V_{DR}$ to close the relay (e.g., drives the drive voltage $V_{DR}$ high) at 1826 (e.g., as in 410 of the method of FIG. 4). For example, the control circuit may determine the time to adjust the drive voltage $V_{DR}$ based on the close relay actuation adjustment time period determined at 1814 and the time of the zero-crossing detected at 1818. If it is determined that the control circuit is turning off the electrical load at 1824, the control circuit may adjust the drive voltage $V_{DR}$ to open the relay (e.g., drives the drive voltage $V_{DR}$ low) at 1828. For example, the control circuit may determine the time to adjust the drive voltage $V_{DR}$ based on the open relay actuation adjustment time period determined at 1816 and the time of the zero-crossing at detected 1818.

Referring to FIG. 18B, at 1830, the control circuit may wait for the start time of an error detection window. If it is determined that the electrical load is being turned on at 1832, the control circuit may monitor the switched-hot zero-cross signal $V_{ZC-SH}$ for a falling edge at 1834 until the end of the error detection window at 1836. If the control circuit detects a falling edge at 1834 during the error detection window, the control circuit may determine that there is an error in the closing time and may re-adjust the close relay actuation adjustment time period at 1838 (e.g., as described herein with respect to FIG. 6).

If it is determined that the electrical load is being turned off at 1832, the control circuit may monitor the switched-hot zero-cross signal $V_{ZC-SH}$ for a rising edge at 1840 until the end of the error detection window at 1836. If the control circuit detects a rising edge at 1840 during the error detection window 1300, the control circuit may determine that there is an error in the opening time. The open relay actuation adjustment time period may be re-adjusted. For example, if it is determined that the rising edge is closer to the end of the error detection window at 1842 (e.g., greater than a midpoint of the error detection window), the control circuit may increase the open relay actuation adjustment time period at 1844. If the rising edge is closer to the beginning of the error detection window at 1842 (e.g., less than the midpoint of the error detection window), the control circuit may decrease the open relay actuation adjustment time period at 1846.

If, after the end of the error detection window at 1836, the control circuit determines that the value of the timer is less than a maximum timer period $T_{MAX}$ at 1848, the control circuit may wait for the start time of the next error detection window at 1830. For example, the maximum timer period $T_{MAX}$ may be approximately forty milliseconds or four half-cycles if the AC power source is operating at 50 Hz. If it is determined that the value of the timer is greater than or equal to the maximum timer period $T_{MAX}$ at 1848, the toggle procedure 1800 may exit.

The control circuit may set error detection threshold(s) and may compare a rising-edge time and/or a falling-edge time of the switched-hot zero-cross signal $V_{ZC-SH}$ to the error detection thresholds. For example, the control circuit may set a first error detection threshold to be a time equal to the falling-edge time $t_{FALL-SH}$ (e.g., as stored at 1720 of the switched-hot zero-cross signal edge procedure 1700 of FIG. 17) plus a buffer time period (e.g., approximately 400 microseconds). The control circuit may set a second error detection threshold to be a time equal to the rising-edge time $t_{RISE-SH}$ (e.g., as stored at 1716 of the switched-hot zero-cross signal edge procedure 1700 of FIG. 17) minus the buffer time period. After receiving a command to turn the electrical load on, the control circuit could record the next falling-edge time (e.g., measured relative to the previous zero-crossing) and compare the falling-edge time to the first and second error thresholds. If the falling-edge time falls within (e.g., between) the error detection thresholds, the control circuit may determine that an error in the closing time of the relay has occurred. After receiving a command to turn the electrical load off, the control circuit may record the last rising-edge time before the relay is open (e.g., measured relative to the previous zero-crossing) and may compare the rising-edge time to the first and second error thresholds. If the rising-edge time falls within the error detection thresholds, the control circuit may determine that an error in the opening time of the relay has occurred.

Figure 20:
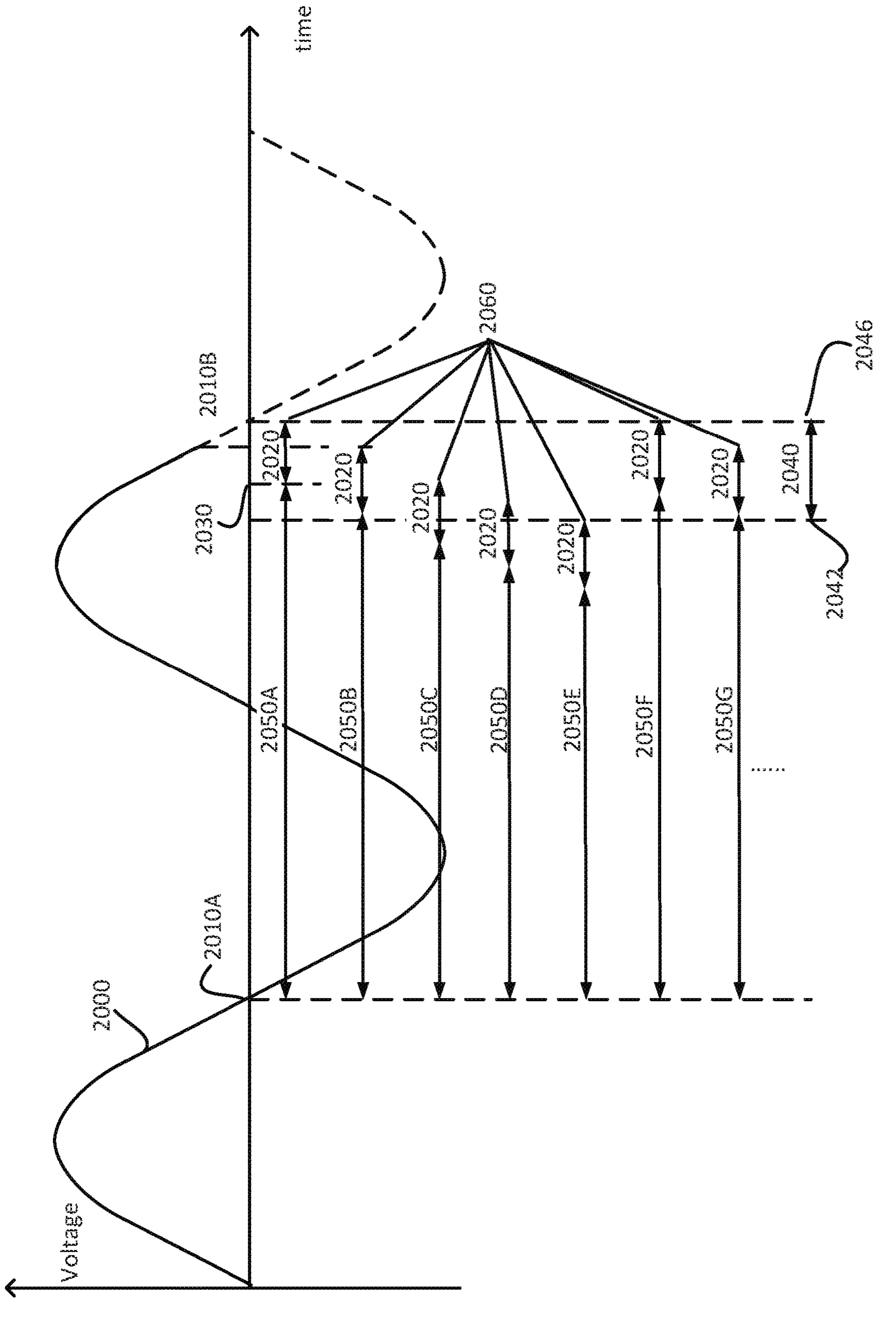
FIG. 20 shows an AC waveform as controlled by an example load control device having adaptive zero cross relay switching with a varying relay open actuation adjustment.

The control circuit may control a conductive state of the controllably conductive device by varying the conductive state change times of the controllably conductive device relative to the target zero crossing. The target zero crossing may be a zero crossing subsequent to a detected zero crossing. For example, the relay open time may vary continuously within a time range prior to the target zero crossing. For example, the relay open time may vary each time (e.g., in response to a comment to turn on the load), every other time, and/or periodically. The relay open time may vary iteratively to hone in on the correct open time. The relay open time may vary by changing the relay actuation adjustment time period (e.g., relay open actuation adjustment time period). FIG. 20 shows an AC waveform in example load control device having adaptive zero cross relay switching with a varying relay open time. In FIG. 20, waveform 2000 depicts the waveform of the AC power source, where the portion in dashed line may represent the voltage of the AC power source, and the portion in solid line may represent the voltage across an electrical load. As shown, the AC waveform 2000 may cross through zero volts at voltage zero crossings such as the zero crossings 2010A and 2010B. The load control device may detect the zero crossings such as zero crossing 2010A and may target the relay contact(s) to open prior to a subsequent zero cross such as the target zero crossing 2010B.

As shown, the load control device may actuate the controllably conductive device at the relay actuation time 2030 prior to the target zero crossing 2010B for the relay opening. The relay actuation time 2030 may follow the detected zero crossing 2010A by relay actuation adjustment time period 2050 (e.g., 2050A-G). For example, the load control device may detect the zero cross 2010A, determine and wait for a relay actuation adjustment time period 2050A, and actuate the relay at the relay actuation time 2030. After the relay is actuated, the relay contact(s) may be opened after the relay-actuation delay time period 2020. The relay-actuation delay time period 2020 may correspond to the time interval between relay actuation time and when the relay contact(s) open (e.g., initially open) and/or close in response to actuation. The relay-actuation delay time period 2020 may or may factor in the average relay contact-bounce duration. For example, the relay-actuation delay time period 2020 may include an average relay contact-bounce duration. For example, the relay-actuation delay time period 2020 may include an average relay contact-bounce duration and one-half of the average relay contact-bounce duration. As shown, the relay contact(s) may open at relay open time 2060.

As shown in FIG. 20, the relay actuation adjustment time period 2050 may be varied continuously, for example, from 2050A to 2050 B, stepping back to 2050C, 2050D, and to 2050E. The relay actuation adjustment time period 2050 may be varied such that the relay open time 2060 may continuously move away from the target zero crossing 2010B within a relay open time range 2040. The left barrier 2042 of the relay open time range 2040 may correspond to a predefined time prior to the target zero crossing 2010B. The right barrier 2046 of the relay open time range 2040 may correspond to the target zero crossing 2010B or a time just prior to the target zero crossing 2010B.

In a given iteration, the relay actuation adjustment time period 2050 may be varied such that the relay open time 2060 may start from the right barrier 2046 and gradually move towards the left barrier 2042. The iteration may end when the relay open time 2060 reaches the left barrier 2042

(e.g., is within a predefined time after the left barrier 2042) of the relay open time range 2040. As shown, when the load control device waits for relay actuation adjustment time period 2050E before actuating the relay, the relay may open at or at a time close to the left barrier 2042. In response to the subsequent relay open signal, the relay actuation adjustment time period 2050F may be used, and the relay may open at or at a time close to the right barrier 2046.

Figure 21:
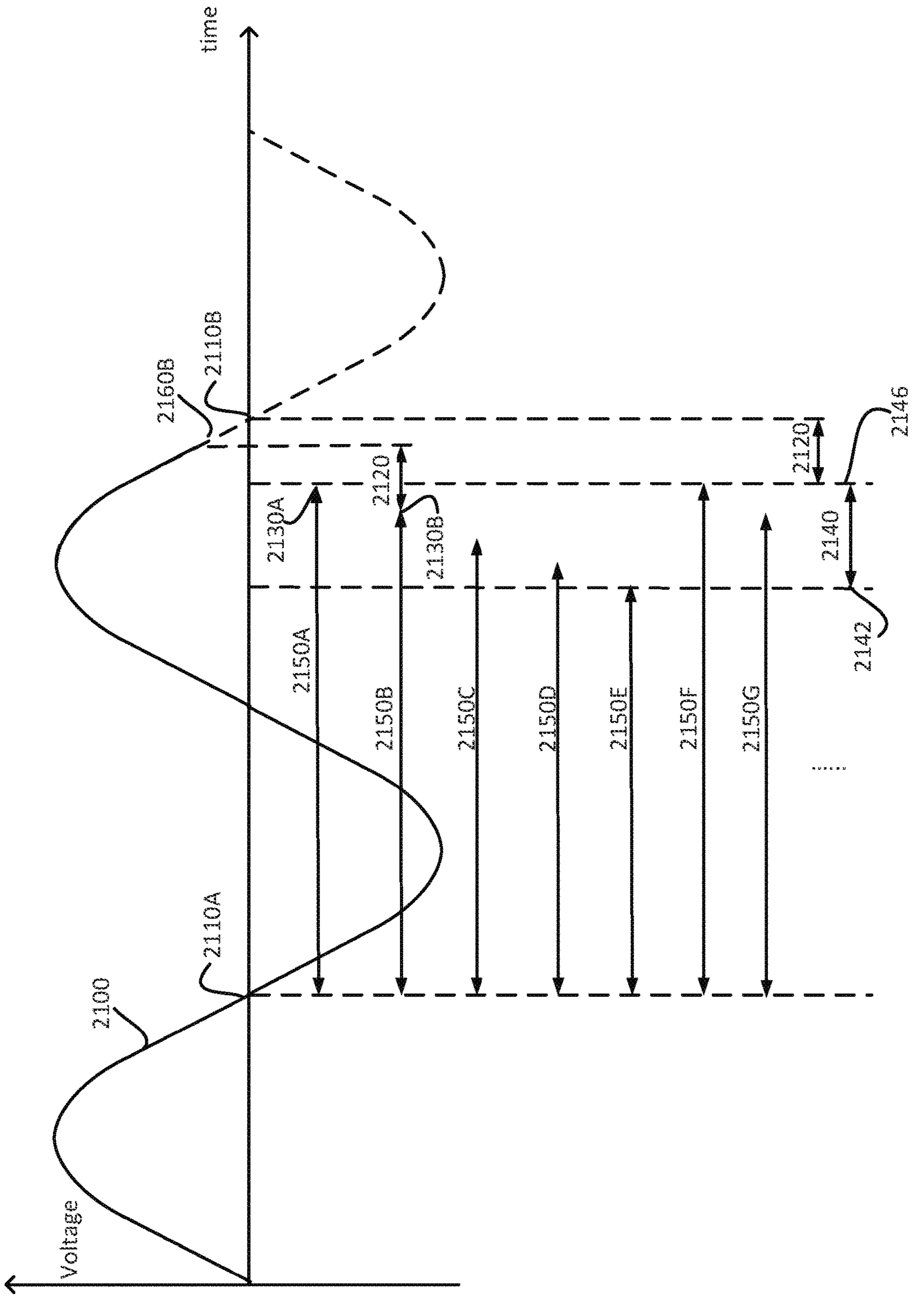
FIG. 21 shows an AC waveform as controlled by an example load control device having adaptive zero cross relay switching with a varying relay open actuation adjustment.

FIG. 21 shows an AC waveform in example load control device having adaptive zero cross relay switching with a varying relay open actuation adjustment time period. In FIG. 21, waveform 2100 depicts the waveform of the AC power source, where the portion in dashed line may represent the voltage of the AC power source, and the portion in solid line may represent the voltage across an electrical load. As shown, the AC waveform 2100 may cross the neutral or zero line at voltage zero crossings such as the zero crossings 2110A and 2110B. The load control device may detect the zero crossings such as zero crossing 2110A and may target the relay contact(s) to open prior to a subsequent zero cross such as the target zero crossing 2110B.

As shown, the load control device may actuate the controllably conductive device at the relay actuation time, such as relay actuation times 2130A and 2130B, prior to the target zero crossing 2110B for the relay opening. The load control device may detect the zero crossing 2110A and determine a relay actuation adjustment time period 2150B. Upon waiting for a time period that corresponds to the relay actuation adjustment time period 2150B, the load control device may actuate the relay at the relay actuation time 2130B. After the relay-actuation delay time period 2120, the relay contact(s) may open at relay open time 2160B. The relay-actuation delay time period 2120 may include an actuation delay period associated with relay open actuations. The relay-actuation delay time period 2120 may correspond to the time interval between relay actuation time and when the relay contact(s) initially open in response to actuation. The relay-actuation delay time period 2120 may or may factor in the average relay contact-bounce duration. For example, the relay-actuation delay time period 2120 may include an average relay contact-bounce duration. For example, the relay-actuation delay time period 2120 may include an average relay contact-bounce duration and one-half of the average relay contact-bounce duration.

As shown in FIG. 21, the relay actuation adjustment time period 2150 may be varied continuously in iterations. For example, a first iteration may include relay actuation adjustment time periods 2150A-2150E, and the next iteration may start with relay actuation adjustment time period 2150F. The relay actuation adjustment time period may be continuously shortened within a range in a given iteration. As shown, the relay actuation adjustment time period 2150 may be varied within a relay open actuation adjustment range 2140. The left barrier 2142 of the relay open actuation adjustment range 2140 may correspond to a predefined time prior to the target zero crossing 2110B. The right barrier 2146 of the relay open actuation adjustment range 2140 may correspond to the target zero crossing 2110B, or a time just prior to the target zero crossing 2110B, offset by the relay-actuation delay time period 2120.

In a given iteration, the relay actuation adjustment time period 2150 may be varied such that the relay actuation adjustment time period 2150 may start from the right barrier 2146 and gradually move towards the left barrier 2142. The iteration may end when the relay actuation adjustment time period 2150 reaches the left barrier 2142 (e.g., within a predefined time period after the left barrier 2142) of the relay open actuation adjustment range 2140. As shown, after the load control device uses a value that corresponds to or close to the left barrier 2142 such as the relay actuation adjustment time period 2150E, a value that corresponds to or close to the right barrier 2146 such as relay actuation adjustment time period 2150F, may be used in response to the subsequent relay open signal.

As shown in FIG. 21, the relay actuation adjustment time period may be continuously shortened within a range in a given iteration (such as relay actuation adjustment time periods 2150A-2150E). Within the iteration, the relay open time may effectively step back, or move away from the target zero crossing 2110B. If the load control device actuates the relay using a relay actuation adjustment time period does not result in the relay contact(s) being opened after the target zero crossing, with a shorter relay actuation adjustment time period in the next actuation, the relay contact(s) should be even less likely to be opened after the target zero crossing. Thus, by continuously varying the relay actuation adjustment time period 2150 in a manner that may continuously move the relay contact open time away from the target zero crossing time, the odds of opening the relay contact(s) after the target zero crossing may be reduced.

What is claimed:

1. An electrical load controller, comprising:

control circuitry to:

- determine a first zero cross time of an AC source voltage cycle using a zero-crossing detection signal that includes a first pulse having a rising edge time and a falling-edge time, the first pulse corresponding to a zero crossing of the AC source voltage;
- determine an actuation time to transition an operatively coupled controllably conductive device between two operating states, wherein the two operating states include a conductive state and a non-conductive operating state;
- determine an actuation adjustment time period based on a frequency of the AC source and the determined actuation time such that the transition of the controllably conductive device between operating states falls coincident with a zero crossing of an immediately subsequent AC source voltage cycle;
- determine an error window extending between a falling edge time of a pulse in the zero-crossing detection signal and a rising edge of an immediately subsequent pulse in the zero-crossing detection signal; and
- generate an output signal to cause the operatively coupled controllably conductive device to transition between the operating states using the determined actuation adjustment time period.

2. The controller of claim 1, wherein to determine the error window extending between the falling edge time of the pulse in the zero-crossing detection signal and the rising edge of an immediately subsequent pulse in the zero-crossing detection signal further comprises:

- determine an error window using a first preset time after the falling edge time of the pulse in the zero-crossing detection signal and a second preset time before the rising edge time of the immediately subsequent pulse in the zero-crossing detection signal.

3. The controller of claim 1, the control circuitry to further:

- determine whether a transition of the controllably conductive device occurs in the error window; and
- responsive to the determination that the transition of the controllably conductive device occurs in the error window, determine a new actuation adjustment time.

4. The controller of claim 1, the control circuitry to further:

increment a cycle counter by a first value for each transition of the controllably conductive device;

determine whether the cycle counter has exceeded a predetermined threshold;

responsive to the determination that the cycle counter has exceeded the predetermined threshold value, determine an updated actuation adjustment time.

5. The controller of claim 4, the control circuitry to further:

responsive to the determination that the that the transition of the controllably conductive device occurs in the error window, increment the cycle counter by a second value, the second value greater than the first value.

6. The controller of claim 1, wherein to determine the actuation time associated with an operatively coupled controllably conductive device, the control circuitry to:

determine an actuation time that includes an actuation delay time period and a contact bounce time period for the controllably conductive device that includes a relay.

7. The controller of claim 1, wherein to determine the actuation time associated with an operatively coupled controllably conductive device, the control circuitry to:

determine an actuation time that includes an actuation delay time period for a controllably conductive device that includes a semiconductor switch.

8. An electrical load control method, comprising:

determining, by control circuitry, a first zero cross time of an AC source voltage cycle using a zero-crossing detection signal that includes a first pulse having a rising edge time and a falling-edge time, the first pulse corresponding to a zero crossing of the AC source voltage;

determining, by the control circuitry, an actuation time to transition an operatively coupled controllably conductive device between two operating states, wherein the two operating states include a conductive state and a non-conductive operating state;

determining, by the control circuitry, an actuation adjustment time period based on a frequency of the AC source and the determined actuation time such that the transition of the controllably conductive device between operating states falls coincident with a zero crossing of an immediately subsequent AC source voltage cycle;

determining, by the control circuitry, an error window extending between a falling edge time of a pulse in the zero-crossing detection signal and a rising edge of an immediately subsequent pulse in the zero-crossing detection signal; and generating, by the control circuitry, an output signal to cause the operatively coupled controllably conductive device to transition between the operating states using the determined actuation adjustment time period.

9. The method of claim 8, wherein determining the error window extending between the falling edge time of the pulse in the zero-crossing detection signal and the rising edge of the immediately subsequent pulse in the zero-crossing detection signal further comprises:

determining, by the control circuitry, an error window using a first preset time after the falling edge time of the pulse in the zero-crossing detection signal and a second preset time before the rising edge time of the immediately subsequent pulse in the zero-crossing detection signal.

10. The method of claim 8, further comprising:

determining, by the control circuitry, whether a transition of the controllably conductive device occurs in the error window; and determining, by the control circuitry, a new actuation adjustment time responsive to the determination that the transition of the controllably conductive device occurs in the error window.

11. The method of claim 8, further comprising:

incrementing, by the control circuitry, a cycle counter by a first value for each transition of the controllably conductive device;

determining, by the control circuitry, whether the cycle counter has exceeded a predetermined threshold; and determining, by the control circuitry, an updated actuation adjustment time responsive to the determination that the cycle counter has exceeded the predetermined threshold value.

12. The method of claim 11, further comprising:

incrementing, by the control circuitry, the cycle counter by a second value, the second value greater than the first value, responsive to the determination that the that the transition of the controllably conductive device occurs in the error window.

13. The method of claim 8 wherein determining the actuation time associated with an operatively coupled controllably conductive device, further comprises:

determining, by the control circuitry, an actuation time that includes an actuation delay time period and a contact bounce time period for controllably conductive device that includes a relay.

14. The method of claim 8 wherein determining the actuation time associated with an operatively coupled controllably conductive device, further comprises:

determining, by the control circuitry, an actuation time that includes an actuation delay time period for a controllably conductive device that includes a semiconductor switch.

15. A non-transitory, machine-readable, storage device that includes instructions that, when executed by control circuitry disposed in an electrical load controller, cause the control circuitry to:

determine a first zero cross time of an AC source voltage cycle using a zero-crossing detection signal that includes a first pulse having a rising edge time and a falling-edge time, the first pulse corresponding to a zero crossing of the AC source voltage;

determine an actuation time to transition an operatively coupled controllably conductive device between two operating states, wherein the two operating states include a conductive state and a non-conductive operating state;

determine an actuation adjustment time period based on a frequency of the AC source and the determined actuation time such that the transition of the controllably conductive device between operating states falls coincident with a zero crossing of an immediately subsequent AC source voltage cycle;

determine an error window extending between a falling edge time of a pulse in the zero-crossing detection signal and a rising edge of an immediately subsequent pulse in the zero-crossing detection signal; and generate an output signal to cause the operatively coupled controllably conductive device to transition between the operating states using the determined actuation adjustment time period.

16. The non-transitory, machine-readable, storage device of claim 15 wherein the instructions that cause the control circuitry to determine the error window extending between the falling edge time of the pulse in the zero-crossing detection signal and the rising edge of the immediately subsequent pulse in the zero-crossing detection signal further cause the control circuitry to:

determine an error window using a first preset time after the falling edge time of the pulse in the zero-crossing detection signal and a second preset time before the rising edge time of the immediately subsequent pulse in the zero-crossing detection signal.

17. The non-transitory, machine-readable, storage device of claim 15 wherein the instructions, when executed by the control circuitry, further cause the control circuitry to:

determine whether a transition of the controllably conductive device occurs in the error window; and determine a new actuation adjustment time responsive to the determination that the transition of the controllably conductive device occurs in the error window.

18. The non-transitory, machine-readable, storage device of claim 15 wherein the instructions, when executed by the control circuitry, further cause the control circuitry to:

increment a cycle counter by a first value for each transition of the controllably conductive device;

determine whether the cycle counter has exceeded a predetermined threshold; and determine an updated actuation adjustment time responsive to the determination that the cycle counter has exceeded the predetermined threshold value.

19. The non-transitory, machine-readable, storage device of claim 18 wherein the instructions, when executed by the control circuitry, further cause the control circuitry to:

increment the cycle counter by a second value, the second value greater than the first value, responsive to the determination that the that the transition of the controllably conductive device occurs in the error window.

20. The non-transitory, machine-readable, storage device of claim 15 wherein the instructions that cause the control circuitry to determine the actuation time associated with an operatively coupled controllably conductive device, further cause the control circuitry to:

determine an actuation time that includes an actuation delay time period and a contact bounce time period for controllably conductive device that includes a relay.

21. The non-transitory, machine-readable, storage device of claim 15 wherein the instructions that cause the control circuitry to determine the actuation time associated with an operatively coupled controllably conductive device, further cause the control circuitry to:

determine an actuation time that includes an actuation delay time period for a controllably conductive device that includes a semiconductor switch.

* * * * *